US011044057B2

(12) United States Patent
Asterjadhi et al.

(10) Patent No.: US 11,044,057 B2
(45) Date of Patent: Jun. 22, 2021

(54) RESOURCE UNIT SPREADING

(71) Applicant: QUALCOMM incorporated, San Diego, CA (US)

(72) Inventors: Alfred Asterjadhi, San Diego, CA (US); Abhishek Pramod Patil, San Diego, CA (US); George Cherian, San Diego, CA (US); Lin Yang, San Diego, CA (US); Bin Tian, San Diego, CA (US); Sameer Vermani, San Diego, CA (US); Lochan Verma, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/502,428

(22) Filed: Jul. 3, 2019

(65) Prior Publication Data
US 2020/0014509 A1 Jan. 9, 2020

Related U.S. Application Data

(60) Provisional application No. 62/694,928, filed on Jul. 6, 2018, provisional application No. 62/713,465, filed on Aug. 1, 2018.

(51) Int. Cl.
*H04L 5/00* (2006.01)
*H04W 72/04* (2009.01)

(52) U.S. Cl.
CPC .......... *H04L 5/0041* (2013.01); *H04L 5/0062* (2013.01); *H04L 5/0073* (2013.01); *H04W 72/042* (2013.01); *H04W 72/0453* (2013.01)

(58) Field of Classification Search
CPC ... H04L 5/0044; H04L 5/0007; H04L 5/0048; H04W 72/044; H04W 72/10; H04W 4/00; H04W 72/0453
See application file for complete search history.

(56) References Cited

U.S. PATENT DOCUMENTS

| 2018/0124788 A1* | 5/2018 | Choi | H04W 72/0453 |
| 2018/0287758 A1* | 10/2018 | Azizi | H04L 27/0008 |
| 2018/0302858 A1* | 10/2018 | Son | H04W 84/12 |

\* cited by examiner

*Primary Examiner* — Iqbal Zaidi
(74) *Attorney, Agent, or Firm* — Holland & Hart LLP; Kevin M. Donnelly

(57) ABSTRACT

This disclosure provides methods, devices, and systems for wireless communications. In some systems, an access point (AP) may assign a resource unit (RU) including a non-contiguous set of tones of a channel to a wireless node, such as a station (STA). The non-contiguous set of tones includes at least some tones that are non-contiguous in the frequency domain with all other tones of the set. The AP may generate an indicator for this RU and may transmit the indicator to the wireless node. The wireless node may receive the indicator, determine the non-contiguous set of tones for the indicated RU, and transmit data over the non-contiguous set of tones for the RU. The AP may receive the data via the RU (over the non-contiguous set of tones).

29 Claims, 20 Drawing Sheets

US 11,044,057 B2

RESOURCE UNIT SPREADING

CROSS REFERENCES

The present Application for Patent claims the benefit of U.S. Provisional Patent Application No. 62/694,928 by Asterjadhi et al., entitled "Resource Unit Spreading," filed Jul. 6, 2018, and U.S. Provisional Patent Application No. 62/713,465 by Yang et al., entitled "A Configuration for Distributed Resource Units," filed Aug. 1, 2018, both of which are assigned to the assignee hereof, and expressly incorporated herein.

TECHNICAL FIELD

This disclosure relates generally to wireless communications and, more specifically, to resource unit (RU) spreading.

BACKGROUND

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Some wireless communications systems (for example, Wi-Fi or WLAN systems) may support allocating multiple resource units (RUs) in a channel bandwidth. These RUs may be used by APs or STAs for transmission of data and pilot signals on the downlink and/or uplink. However, the configurations of these RUs—such as the locations of the allocated data and pilot tones for each RU—may not efficiently utilize the available transmit power for a device. Additionally or alternatively, the RUs may support limited frequency diversity, reducing the reliability of messages transmitted by the device in the RUs.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communication. The method includes assigning a first resource unit (RU) to a first wireless node, in which the first RU includes a first non-contiguous set of tones of a channel, generating a first indicator indicating the first RU, outputting the first indicator for transmission, and obtaining data from the first wireless node via the first RU.

Another innovative aspect of the subject matter described in this disclosure can be implemented in a wireless communication device. The wireless communication device includes a processor, memory coupled with the processor, and instructions stored in the memory. The instructions may be executable by the processor to cause the apparatus to assign a first RU to a first wireless node, in which the first RU includes a first non-contiguous set of tones of a channel, generate a first indicator indicating the first RU, output the first indicator for transmission, and obtain data from the first wireless node via the first RU.

In some implementations, the methods and wireless communication devices may be configured to assign a second RU to a second wireless node, in which the second RU includes a second non-contiguous set of tones of the channel, generate a second indicator indicating the second RU, output the second indicator for transmission, and obtain data from the second wireless node via the second RU.

In some implementations of the methods and wireless communication devices, the first non-contiguous set of tones may be interspersed with the second non-contiguous set of tones.

In some implementations, the methods and wireless communication devices may be configured to generate a trigger frame including the first indicator and the second indicator and output the trigger frame for transmission. Outputting the trigger frame may include outputting the first indicator and outputting the second indicator.

In some implementations of the methods and wireless communication devices, the data from the first wireless node and the data from the second wireless node may be obtained concurrently.

In some implementations, the methods and wireless communication devices may be configured to determine the first non-contiguous set of tones and the second non-contiguous set of tones from a set of tones associated with a channel.

In some implementations, the methods and wireless communication devices may be configured to generate an indication of a mapping from the first indicator to the first non-contiguous set of tones and output the indication of the mapping for transmission.

In some implementations, the methods and wireless communication devices may be configured to change the first non-contiguous set of tones on a periodic basis according to a pattern.

In some implementations, the methods and wireless communication devices may be configured to generate an indication of the pattern and output the indication of the pattern for transmission.

In some implementations of the methods and wireless communication devices, the first non-contiguous set of tones may be defined at least in part by a function.

In some implementations of the methods and wireless communication devices, the function may be an example of a hashing function that provides a start index for the first non-contiguous set of tones.

In some implementations, the methods and wireless communication devices may be configured to generate one or both of an indication of the function or one or more parameter values for the function and output, for transmission, one or both of the indication of the function or the one or more parameter values.

In some implementations, the methods and wireless communication devices may be configured to obtain a request from the first wireless node requesting an RU including a non-contiguous set of tones. The first RU may be assigned to the first wireless node in response to the request.

In some implementations, the methods and wireless communication devices may be configured to obtain a message from the first wireless node indicating that the first wireless node is experiencing interference. The first RU may be assigned to the first wireless node in response to the message.

In some implementations, the methods and wireless communication devices may be configured to determine, for the channel, one or more tones experiencing interference and exclude the one or more determined tones from the first non-contiguous set of tones.

In some implementations, the methods and wireless communication devices may be configured to obtain a message from the first wireless node or another wireless node indicating the one or more tones experiencing the interference. Determining the one or more tones may involve determining the one or more tones according to the message.

In some implementations of the methods and wireless communication devices, the message may include a channel quality indicator (CQI) index or a bandwidth query response (BQR).

In some implementations, the methods and wireless communication devices may be configured to allocate a transmission time interval (TTI) for the first wireless node to transmit the data, generate an indication of the TTI, and output the indication of the TTI for transmission. The TTI may include a set of time slots and the first non-contiguous set of tones is different in at least one time slot of the set of time slots than at least one other time slot of the set of time slots.

In some implementations, the methods and wireless communication devices may be configured to generate an indication of a mapping from the first indicator to the first non-contiguous set of tones for each of the set of time slots and output the indication of the mapping for transmission.

In some implementations of the methods and wireless communication devices, the first non-contiguous set of tones may change in each of the set of time slots according to a pattern, and the methods and wireless communication devices may be configured to generate an indication of the pattern and output the indication of the pattern for transmission.

In some implementations, the methods and wireless communication devices may be configured to generate a trigger frame including the first indicator and the indication of the TTI. Outputting the first indicator and the indication of the TTI for transmission may include outputting the trigger frame for transmission.

In some implementations, the methods and wireless communication devices may be configured to generate an indication of a time duration of each of the set of time slots and output the indication of the time duration of each of the set of time slots for transmission.

In some implementations, the methods and wireless communication devices may be configured to determine the first non-contiguous set of tones distributed across a channel bandwidth, in which a majority of the first non-contiguous set of tones includes distributed pairs of adjacent tones and the channel bandwidth includes one or more leading unused edge tones, a first contiguous portion of useful tones, one or more unused direct current (DC) tones, a second contiguous portion of useful tones, and one or more following unused edge tones, the first contiguous portion of useful tones and the second contiguous portion of useful tones including the determined first non-contiguous set of tones, obtain data over a set of data tones of the determined first non-contiguous set of tones, and obtain one or more pilot signals over a set of pilot tones of the determined first non-contiguous set of tones.

In some implementations, the methods and wireless communication devices may be configured to allocate the channel bandwidth for a set of logic RUs including at least the first RU, in which pilot tones for the set of logic RUs form one or more contiguous sets of pilot tones, and each set of the one or more contiguous sets of pilot tones borders the one or more leading unused edge tones, the one or more unused DC tones, or the one or more following unused edge tones.

In some implementations, the methods and wireless communication devices may be configured to allocate the channel bandwidth for a set of logic RUs including at least the first RU, in which pilot tones for the set of logic RUs form one or more contiguous sets of pilot tones, and each set of the one or more contiguous sets of pilot tones is allocated to central tones in the first contiguous portion of useful tones or to central tones in the second contiguous portion of useful tones.

In some implementations of the methods and wireless communication devices, each pilot tone of the set of pilot tones may be contiguous to two data tones of the set of data tones.

In some implementations, the methods and wireless communication devices may be configured to additionally assign the first RU to a second wireless node different than the first wireless node. The data from the first wireless node may be obtained via a first subset of the first non-contiguous set of tones, and the methods and wireless communication devices may be configured to obtain data from the second wireless via a second subset of the first non-contiguous set of tones.

In some implementations of the methods and wireless communication devices, the first subset of the first non-contiguous set of tones may be non-contiguous and the second subset of the first non-contiguous set of tones may be non-contiguous.

In some implementations of the methods and wireless communication devices, the first subset of the first non-contiguous set of tones may be interspersed with the second subset of the first non-contiguous set of tones.

In some implementations of the methods and wireless communication devices, the data from the first wireless node and the data from the second wireless node may be obtained concurrently.

In some implementations, the methods and wireless communication devices may be configured to generate a trigger frame including a first field indicating the first indicator is for the first wireless node and a second field indicating the first indicator is for the second wireless node and output the trigger frame for transmission.

In some implementations of the methods and wireless communication devices, the first subset of the first non-contiguous set of tones and the second subset of the first non-contiguous set of tones may be defined at least in part by a function.

In some implementations, the methods and wireless communication devices may be configured to generate an indication of the function and output the indication of the function for transmission.

In some implementations of the methods and wireless communication devices, one or both of the data from the first wireless node or the data from the second wireless node may be obtained over a time interval, the time interval including a set of time slots and one or both of the first subset of the first non-contiguous set of tones or the second subset of the first non-contiguous set of tones may change in at least one time slot of the set of time slots.

In some implementations of the methods and wireless communication devices, the first subset of the first non-contiguous set of tones may change in each of the set of time slots according to a pattern, and the methods and wireless communication devices may be configured to generate an indication of the pattern and output the indication of the pattern for transmission.

Another innovative aspect of the subject matter described in this disclosure can be implemented in a method for wireless communication. The method includes obtaining a first indicator indicating a first RU, determining a first non-contiguous set of tones of a channel for the first RU, and outputting data for transmission over the first non-contiguous set of tones for the first RU.

Yet another innovative aspect of the subject matter described in this disclosure can be implemented in a wireless communication device. The wireless communication device includes a processor, memory coupled with the processor, and instructions stored in the memory. The instructions may be executable by the processor to cause the apparatus to obtain a first indicator indicating a first RU, determine a first non-contiguous set of tones of a channel for the first RU, and output data for transmission over the first non-contiguous set of tones for the first RU.

In some implementations, the methods and wireless communication devices may be configured to obtain one or more of a trigger frame including the first indicator, an indication of a mapping from the first indicator to the first non-contiguous set of tones, an indication of a pattern for changing the first non-contiguous set of tones on a periodic basis, an indication of a function defining the first non-contiguous set of tones, or one or more parameters for the function, and the first non-contiguous set of tones for the first RU may be determined according to one or more of the trigger frame, the mapping, the pattern, the function, or the one or more parameters for the function.

In some implementations, the methods and wireless communication devices may be configured to output, for transmission, one or both of a request requesting an RU or a message indicating that the wireless node is experiencing interference, in which the first indicator indicating the first RU may be obtained in response to one or both of the request or the message.

In some implementations of the methods and wireless communication devices, a majority of the first non-contiguous set of tones includes distributed pairs of adjacent tones across a channel bandwidth and the channel bandwidth includes one or more leading unused edge tones, a first contiguous portion of useful tones, one or more unused DC tones, a second contiguous portion of useful tones, and one or more following unused edge tones, the first contiguous portion of useful tones and the second contiguous portion of useful tones including the determined first non-contiguous set of tones. The methods and wireless communication devices may be configured to output, for transmission, one or more pilot signals over a set of pilot tones of the first non-contiguous set of tones, and the data may be output for transmission over a set of data tones of the first non-contiguous set of tones.

In some implementations, the methods and wireless communication devices may be configured to determine that the first RU is additionally assigned to a second wireless node different than the wireless node, and outputting the data may further involve outputting the data for transmission over a first subset of the first non-contiguous set of tones for the first RU.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
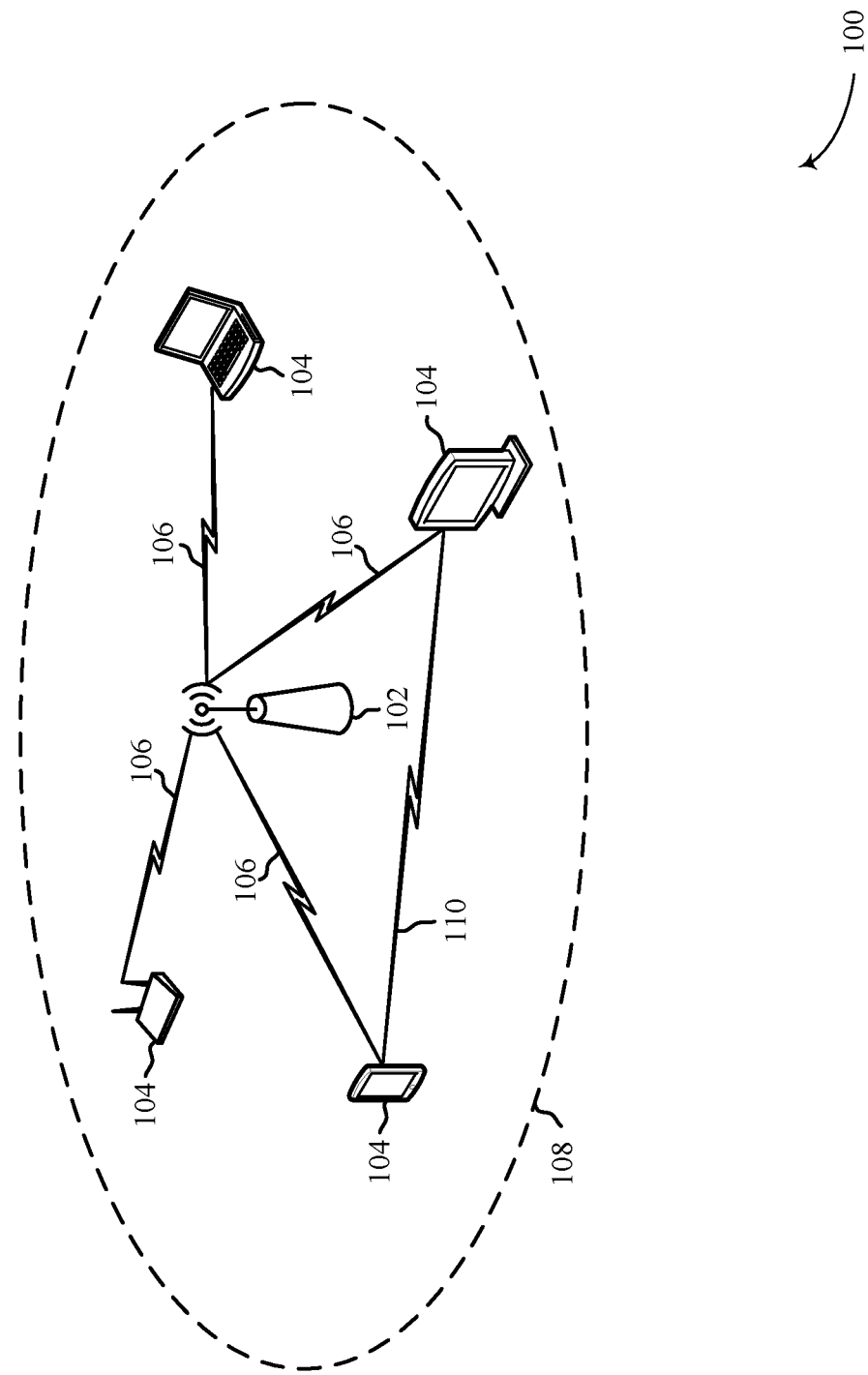
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate generally to the assignment of non-contiguous tones of a channel for a resource unit (RU). Some implementations more specifically relate to an access point (AP) assigning an RU including a non-contiguous set of tones of a channel to a wireless node, such as a station (STA). This non-contiguous set of tones includes at least one portion of tones that is non-contiguous in the frequency domain with all other portions of tones of the set. For example, the non-contiguous set of tones may include at least some tones that are non-contiguous in frequency with all other tones of the set. The AP may generate an indicator for this RU and may transmit the indicator to the wireless node. The wireless node may receive the indicator, determine the non-contiguous set of tones for the indicated RU, and transmit data over the non-contiguous set of tones for the RU. The AP may receive the data via the RU (for example, over the non-contiguous set of tones).

In some implementations, the AP, the STA, or both may determine the non-contiguous set of tones based on a mapping of tones, a function (for example, a hashing function), or both. The non-contiguous set of tones for an RU may change for different time intervals, for example, according to a pattern, according to a function, or based on a message from the AP. In some examples, RUs for different STAs may be interspersed (for example, interleaved) in frequency. Additionally, more than one STA may be assigned the same RU. In such implementations, each STA assigned the same RU may determine a subset of tones to use from the assigned RU.

In some implementations, the majority of tones for an RU may be mapped to distributed pairs of adjacent tones in the channel bandwidth. These tones may include data tones and pilot tones. In a first implementation, the data tones are mapped to pairs of adjacent tones, and the pilot tones are mapped to tones near the edges of the bandwidth or near a direct current (DC) tone in the center of the bandwidth. In a second implementation, the data tones are mapped to pairs of adjacent tones, and the pilot tones are mapped to tones in the center of each half of the bandwidth. In a third implementation, most of the data tones are mapped to pairs of adjacent tones, but the pilot tones may each be allocated to one set of data tones, and each pilot tone is allocated between the two data tones in the respective one set of data tones. In some of these implementations, the allocation of the pilot tones may support at least two pilot tones being far apart in the channel bandwidth for an RU (for example, separated by 30% or 50% of the total channel bandwidth).

Particular implementations of the subject matter described in this disclosure can be implemented to realize one or more of the following potential advantages. In some implementations, the described techniques can be used to efficiently utilize a given bandwidth. For example, an AP may distribute RUs across a channel bandwidth or bandwidth part to improve the frequency diversity and available power for transmissions. If the tones of an RU are close together in the frequency domain (for example, contiguous in frequency), a narrow band interference may wipe out the contents of the corresponding RU. For example, the tones of an RU may be subject to narrow band interference from neighboring APs and/or STAs. Aspects of the present disclosure support RU configurations including non-contiguous sets of tones spread over a wide frequency band, mitigating the effects of narrow band interference. Additionally or alternatively, spreading the tones of the RU over a wider channel bandwidth may support transmitting data using the full power advantage. The full power advantage may correspond to transmitting with a maximum transmit power or peak power, while still remaining below a power spectral density (PSD) limit for the system.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an AP 102 and multiple STAs 104. While only one AP 102 is shown, the WLAN 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct wireless link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the physical layer (PHY) and medium access control (MAC) layer. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

As described above, APs 102 and STAs 104 can support multi-user (MU) communications; that is, concurrent transmissions from one device to each of multiple devices (for example, multiple simultaneous downlink communications from an AP 102 to corresponding STAs 104), or concurrent transmissions from multiple devices to a single device (for example, multiple simultaneous uplink transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For uplink MU transmissions, an AP 102 can transmit a trigger frame to initiate and synchronize an uplink MU- OFDMA or uplink MU-MIMO transmission from multiple STAs 104 to the AP 102. Such trigger frames may thus enable multiple STAs 104 to send uplink traffic to the AP 102 concurrently in time. A trigger frame may address one or more STAs 104 through respective association identifiers (AIDs) and may assign each AID (and thus each STA 104) one or more RUs that can be used to send uplink traffic to the AP 102. The AP 102 also may designate one or more random access (RA) RUs that unscheduled STAs 104 may contend for.

In some systems, such as WLAN 100, an AP 102 may assign an RU to a wireless node, such as a STA 104. The assigned RU may include a non-contiguous set of tones of a channel. This non-contiguous set of tones may include at least some tones that are non-contiguous in the frequency domain with all other tones of the set. The AP 102 may generate an indicator for this RU and may transmit the indicator to the STA 104. The STA 104 may receive the indicator, determine the non-contiguous set of tones for the indicated RU, and transmit data over the non-contiguous set of tones for the RU. The AP 102 may receive the data via the RU (over the non-contiguous set of tones). By spreading the RU over the non-contiguous set of tones, the AP 102 may support improved frequency diversity for transmissions via the RU.

Figure 2:
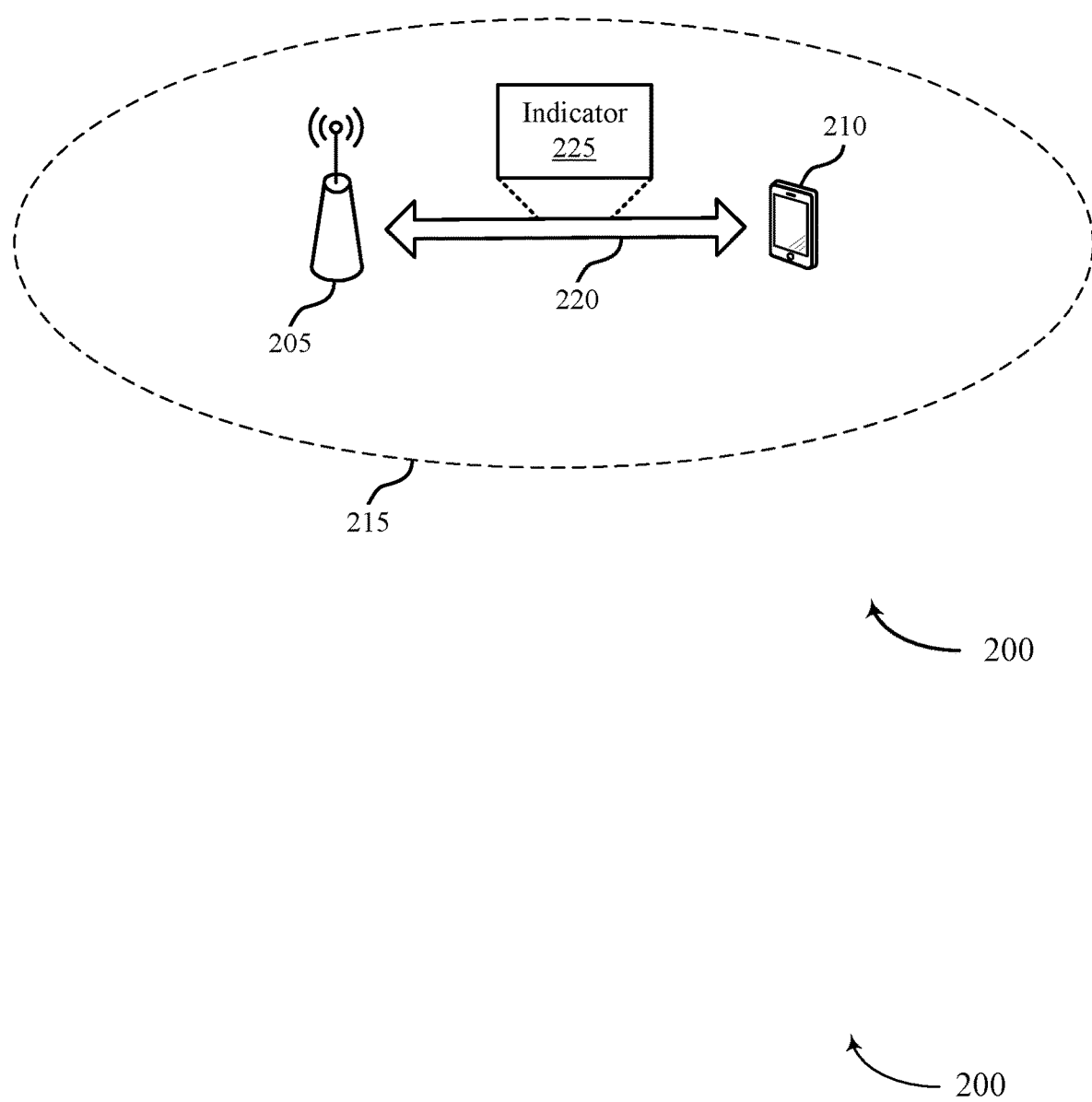
FIG. 2 shows a pictorial diagram of another example wireless communication network.

FIG. 2 shows a pictorial diagram of another wireless communication network 200. The wireless communication network 200 may support RU spreading in accordance with aspects of the present disclosure. In some implementations, the wireless communication network 200 may be an example of a WLAN 100 and may include AP 205 and STA 210, which may be examples of the corresponding devices described with reference to FIG. 1. AP 205 may provide network coverage for coverage area 215. AP 205 and STA 210 may communicate over communication link 220 (for example, transmitting data and/or pilot signals on the uplink or the downlink).

In some examples, the AP 205 may assign a channel to the STA 210 to transmit data to and receive data from the STA 210. The channel may include tones (also referred to as subcarriers) within the frequency band of the channel. Orthogonal frequency-division multiplexing (OFDM) may be used for transmissions between the AP 205 and the STA 210. The channel may be divided (in other words, partitioned) into multiple resource units (RUs), and each RU may contain a respective subset of the tones of the channel.

In some examples, the tones in a contiguous set of tones may lack in frequency diversity. For example, for a same number of tones, a non-contiguous configuration supports greater frequency diversity than a contiguous configuration based on the spread of the tones over a wider bandwidth part. When the tones are close together, a narrow band interference may wipe out the contents of the corresponding RU. For example, in a dense network deployment, the tones may be subject to narrow band interference from an overlapping BSS. Aspects of the present disclosure support RU configurations including non-contiguous sets of tones. The tones of a non-contiguous set of tones are spread in frequency (in other words, tones are spaced apart in frequency) compared with a contiguous set of tones. This may include an RU in which each tone is non-contiguous in frequency with each other tone of the RU or may include an RU in which at least one set of tones is non-contiguous with at least one other set of tones in frequency (for example, the RU may be split into two or more portions separated by gaps in frequency). A non-contiguous configuration may reduce sensitivity of the RU to narrow band interference and has the benefit of diversity gain due to the RU spreading.

In some examples, the AP 205 may assign an RU, including a non-contiguous set of tones in the channel, to the STA 210. The AP 205 may generate an indicator 225 for the RU and transmit the indicator 225 to the STA 210. The STA 210 may receive the indicator 225 from the AP 205 and use the indicator 225 to determine the non-contiguous set of tones for the RU. The STA 210 may transmit data over the non-contiguous set of tones to the AP 205.

Figure 3:
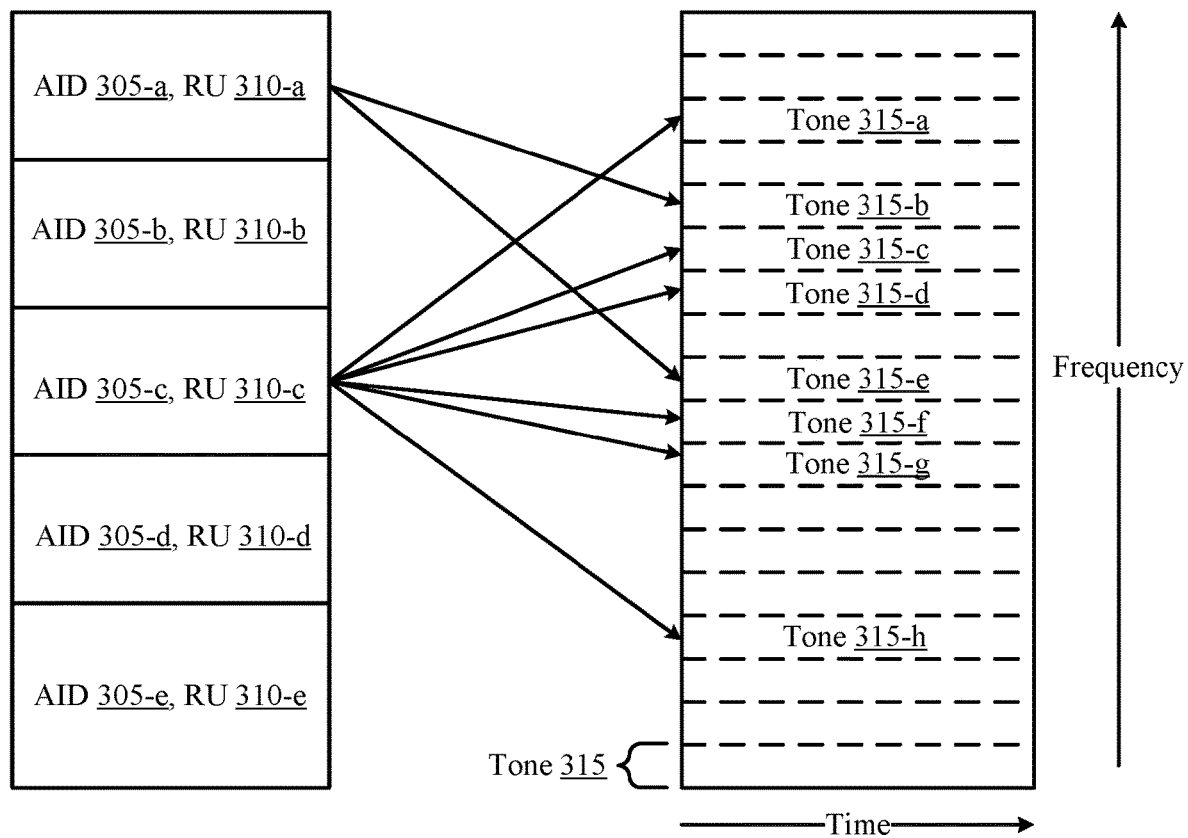
FIG. 3 shows an example of a resource unit (RU) configuration in accordance with aspects of the present disclosure.

FIG. 3 shows an example of an RU configuration 300 in accordance with aspects of the present disclosure. In the RU configuration 300, an RU 310 may be assigned to a STA, such as a STA described with reference to FIGS. 1 and 2. In one example, RU 310-$a$ is assigned to the STA identified by AID 305-$a$, RU 310-$b$ is assigned to the STA identified by AID 305-$b$, RU 310-$c$ is assigned to the STA identified by AID 305-$c$, RU 310-$d$ is assigned to the STA identified by AID 305-$d$, RU 310-$e$ is assigned to the STA identified by AID 305-$e$. The RUs 310 may contain non-contiguous sets of tones. As shown in FIG. 3, the tones in each non-contiguous set of tones are spread (in other words, spaced apart) in frequency. Although a limited number of tones is shown in FIG. 3 for ease of illustration, it is to be appreciated that a non-contiguous set of tones may have a larger number of tones (for example, 26 tones, 52 tones, 106 tones, or any other number of tones).

The tones 315 in a non-contiguous set of tones—such as tones 315-$a$, 315-$c$, 315-$d$, 315-$f$, 315-$g$, and 315-$h$ for RU 310-$c$—may be taken from the set of tones of a channel (for example, a 20 MHz channel, a 40 MHz channel, an 80 MHz channel, a 160 MHz channel, a 320 MHz channel, or any other channel), in which the non-contiguous set of tones is a subset of the set of tones of the channel. As shown in FIG. 3, adjacent tones in the non-contiguous set of tones for RU 310-$c$ may be separated by spaces (in other words, gaps) occupied by tones 315 in the channel which may be unassigned or assigned to one or more other RUs 310. In the example shown in FIG. 3, RU 310-$a$ include a non-contiguous set of tones that is interspersed with the non-contiguous set of tones of RU 310-$c$. The non-contiguous set of tones of RU 310-$a$ includes tones, such as tones 315-$b$ and 315-$e$, that are located between tones in the non-contiguous set of tones of RU 310-$c$. The tones in RU 310-$a$ and RU 310-$c$ may be assigned from the same channel (for example, a 20 MHz channel, a 40 MHz channel, an 80 MHz channel, a 160 MHz channel, a 320 MHz channel, or some other channel). The STAs assigned RU 310-$a$ and RU 310-$c$ may transmit data concurrently to an AP (for example, the AP assigning RU 310-$a$ and RU 310-$c$) via their respective non-contiguous sets of tones (for example, in uplink PPDUs triggered by a trigger frame) and/or receive data concurrently from the AP via their respective non-contiguous sets of tones. There may be different schemes by which a tone plan for an RU 310 is made available to a STA, as discussed further below.

In some aspects, a wireless device, such as an AP and/or a STA, may use a map to map each RU 310 to a respective non-contiguous set of tones. The map may be fixed (for example, defined by a standard) or dynamically changed. In some examples, a STA may store the map in memory. In this example, each available RU may be identified by a respective RU value (for example, an RU index number), and the map may map each RU to a respective non-contiguous set of tones by mapping the respective RU value to the respective non-contiguous set of tones. The STA may receive an indictor (for example, an RU value) indicating an RU assigned to the STA (for example, in a trigger frame or in a downlink transmission) from an AP. The STA may determine the non-contiguous set of tones for the assigned RU based on the map. More particularly, the STA may locate the RU value of the assigned RU in the map and determine the non-contiguous set of tones that is mapped to the RU value. In this example, each tone 315 in a channel may be identified by a respective number index, and the map may specify the non-contiguous set of tones for each RU using the number indices of the tones 315.

Different maps may be used for different operating frequency bands. For example, different maps may be used for the 2.4 GHz band and the 5.0 GHz band. In this example, a STA may store maps for different operating frequency bands supported by the STA. In operation, the STA may determine which band is currently being used for communication with an AP and use the corresponding map to determine the non-contiguous set of tones for an RU 310 assigned to the STA, as discussed herein. Different maps may also be used for different geographical regions.

In some aspects, an AP may transmit the map to one or more STAs. For example, the AP may transmit the map to the STA in a beacon or another management frame. In these aspects, a STA receiving the map stores the map in memory and uses the map to determine the non-contiguous set of tones for an RU 310 assigned to the STA by the AP, as discussed above. This allows the AP to change (for example, update) the map used by the STA.

In some examples, the AP may determine one or more tones 315 experiencing interference (for example, from an overlapping BSS (OBSS)), generate a map that excludes the one or more determined tones 315, and transmit the generated map to one or more STAs. This may ensure that the non-contiguous set of tones for an RU 310 assigned to a STA by the AP does not include the one or more tones 315 experiencing interference (in other words, the one or more tones 315 experiencing interference are excluded from the non-contiguous set of tones of each RU 310 in the map). In this example, the AP may determine the one or more tones 315 experiencing interference using various methods. In some implementations, the AP may receive a message (for example, a report) from one or more STAs indicating the one or more tones 315 experiencing interference. For example, the AP may receive a channel quality indicator (CQI) or bandwidth query response (BQR) indicating the quality of individual tones 315 and/or groups of tones 315. In this example, the AP may determine that a tone 315 with low quality is experiencing interference or each tone 315 in a group of tones with low quality is experiencing interference. In some examples, the AP may monitor for an interfering signal on each tone 315 during a time that the AP is not using the tone 315. If the AP detects an interfering signal of a particular signal strength on a specific tone 315, the AP may determine the tone 315 is experiencing interference. It is to be appreciated that the AP may employ other methods to determine tones 315 experiencing interference.

In some aspects, each STA may store multiple maps, in which each map may map the same RU 310 to a different non-contiguous set of tones. In these aspects, the AP may select one of the maps and transmit an indication of the selected map to the STAs in a beacon or another management frame. In these aspects, a STA receiving the indication uses the indicated map to determine the non-contiguous set of tones for an RU 310 assigned to the STA by the AP, as discussed above. In some examples, each map may be identified by a respective map identifier (ID). In some of these examples, the AP may indicate which map to use by transmitting the respective map ID to one or more STAs (for example, in a beacon or another management frame). A STA receiving the map ID uses the map ID to identify the map being used by the AP and uses the identified map to determine the non-contiguous set of tones for an RU 310 assigned to the STA by the AP, as discussed above.

In some aspects, neighboring APs may use different maps to mitigate interference. For example, each AP may transmit a message to neighboring APs indicating the map in use by the transmitting AP. In this example, an AP receiving the message uses a map that is different than the map indicated in the message to mitigate interference. In some aspects, a map may change over time (for example, on a periodic or aperiodic basis) according to a pattern. For example, for a particular BSS color, the pattern may be known by the STAs.

In some examples, a map may include different sets of tones (for example, sets of non-contiguous tones) and the map may be changed by changing the mapping between the RU values and the sets of tones in the map. For example, each set of tones in the map may be identified by a respective set ID (for example, set index number). In this example, the mapping for a particular RU value is specified by the set ID of the set of tones to which the RU value is mapped. In this example, the mapping for the RU value may be changed by changing the set ID associated with the RU value. Thus, the map may be changed by changing the set ID associated with each RU value in the map such that the mapping between the RU values and the sets of tones is changed.

In the above example, the map may change according to a pattern. For example, the pattern may be specified by a sequence of set IDs for each RU value. In this example, the mapping for a particular RU value is changed by running through a respective sequence of set IDs. For instance, if a sequence for an RU value is given by 1, 3, 5, . . . , n, in which n is a maximum set ID or a maximum odd set ID, then the RU value is first mapped to the set of tones identified by the set ID of 1, then mapped to the set of tones identified by the set ID of 3, and so on. As a result, the set of tones of the corresponding RU 310 is changed by running through the sequence.

As discussed above, the map may change according to a pattern. For example, the pattern may change the map by changing the mapping between RU values and the sets of tones in the map according to the pattern. For instance, a pattern may involve changing the set ID of each RU 310 by a particular value each time the map is changed. In some examples, a pattern may be defined by a sequence of set IDs for each RU value. In this example, the STA may repeat each sequence. In other words, when the STA reaches the last set ID in the sequence, the STA may start over at the first set ID in the sequence. In some examples, an algorithm may be used to generate a sequence of set IDs for an RU value according to a desired pattern. In this example, the sequence of set IDs generated by the algorithm may be a function of one or more parameters input to the algorithm. The values of the one or more parameters may be chosen according to the desired pattern.

The map may change periodically. For example, each STA and/or the AP may change the map at regular time intervals. For example, the AP may specify the time interval between changes and may transmit an indication of the time interval to the STAs (for example, in a management frame). In this example, each STA changes the map according to the time interval indicated by the AP. The time interval determines the rate at which each STA changes the map. In some examples, each STA may change the map each time the AP transmits a trigger frame to the STA.

As discussed above, each STA may change the map according to a pattern. In some examples, the AP may specify the pattern, and transmit an indication of the pattern to the STAs. In these examples, each STA changes the map according to the pattern indicated by the AP. The AP may indicate the pattern using various methods. For the example in which the pattern for each RU value is specified by a sequence of set IDs, the AP may indicate the sequence of set IDs for each RU value. For the example in which the STA uses an algorithm to generate a sequence of set IDs for each RU value, the AP may indicate one or more parameter values for the algorithm. The one or more parameters values may determine the sequence of set IDs generated by the algorithm.

Figure 4:
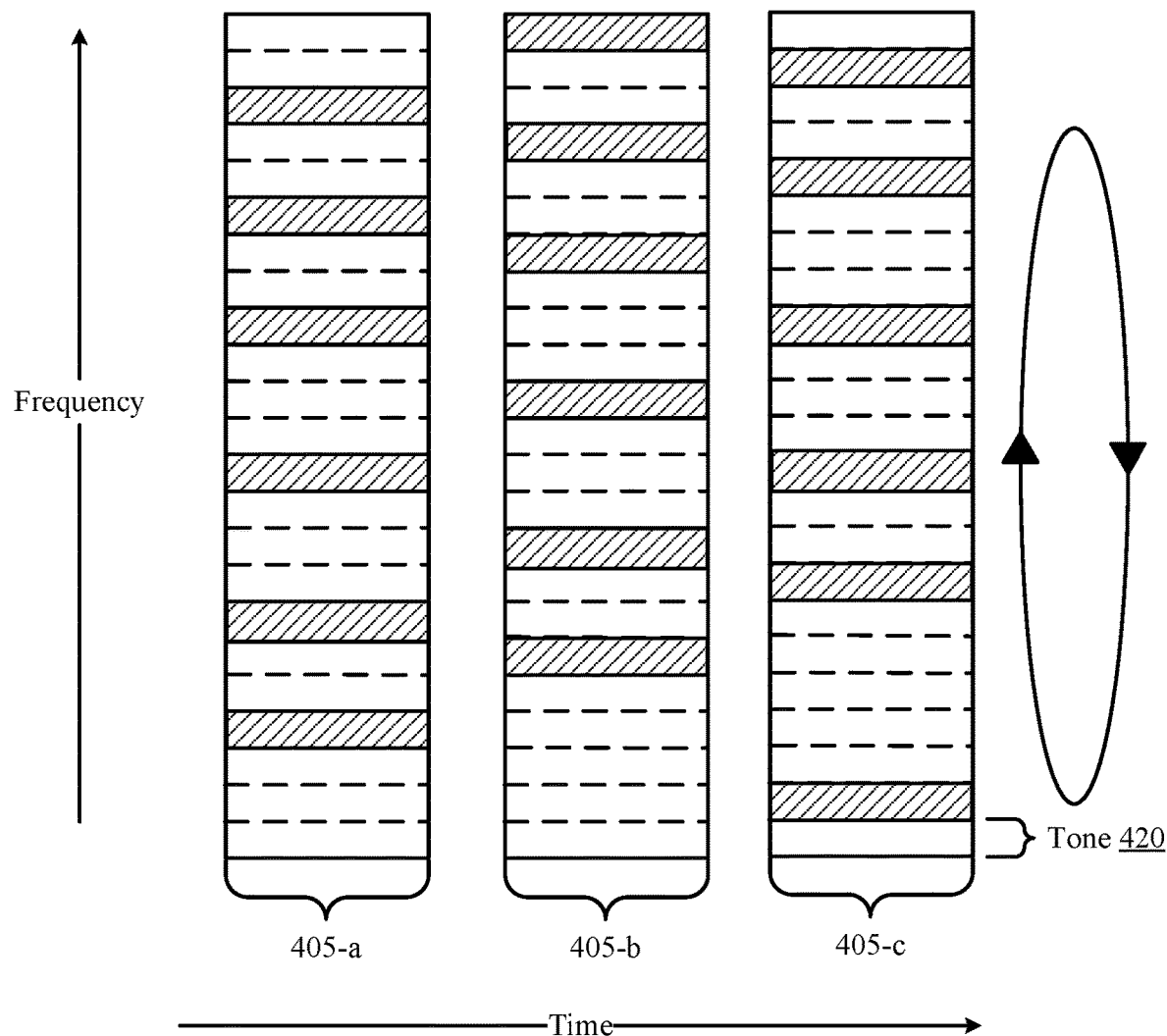
FIG. 4 shows an example of a set of tones for a spread RU in a channel.

FIG. 4 shows an example of a set of tones 400 for a spread RU in a channel. In some aspects, a STA—such as a STA described with reference to FIGS. 1 and 2—may change a set of non-contiguous tones assigned to an RU by shifting the tones in the non-contiguous tones by a shift value. An example of this tone 420 shifting is illustrated in FIG. 4. It is to be appreciated that the number of tones 420 shown in FIG. 4 is small for ease of illustration and that the number of tones may be larger (for example, 242 tones for a 20 MHz channel). FIG. 4 shows an example of a non-contiguous set of tones assigned to an RU 410 and a set of tones not assigned to this RU 415 for time intervals 405-a, 405-b, and 405-c. The set of tones 415 may or may not be assigned to one or more other RUs. It is to be appreciated that the number of tones 420 in the non-contiguous set of tones assigned to the RU 410 shown in FIG. 4 is small for ease of illustration, and that the number of tones 420 may be larger (for example, 26 tones, 52 tones, or any other number of tones).

In this example, the tones in the non-contiguous set of tones assigned to the RU 410 are shifted by a shift value for each time interval 405. For example, the tones 420 may be shifted by two tone positions for each time interval 405. However, it is to be appreciated that the shift may be larger (for example, 15 tone positions or any other number of tone positions). As shown in FIG. 4, the shifting of the tones may be circular, in which a tone that reaches the top-most tone in the channel (for example, the bandwidth part of the channel for the RU) starts back at the bottom-most tone in the channel in frequency. Circular shifting helps ensure that the tones in the non-contiguous set of tones assigned to the RU 410 stay within the channel (for example, a 20 MHz channel, a 40 MHz channel, an 80 MHz channel, a 160 MHz channel, a 320 MHz channel, or any other channel) or within the bandwidth part of the channel allocated for the RU. It is to be appreciated that the circular shifting is not limited to the direction shown in FIG. 4 and that the tones may be shifted in the opposite direction.

The shift value may be constant (in other words, the tones in the non-contiguous set of tones assigned to the RU 410 may be shifted by the same amount for each time interval 405). In this example, the AP may specify the shift value and transmit an indication of the shift value to the STA. The STA may shift the tones in the non-contiguous set of tones assigned to the RU 410 by the shift value indicated by the AP. For example, the tones of the non-contiguous set of tones assigned to the RU 410 for time interval 405-a may be shifted up by a constant value (for example, two tones) in each subsequent time interval 405, such that the non-contiguous set of tones assigned to the RU 410 for time interval 405-b is different than the non-contiguous set of tones assigned to the RU 410 for time interval 405-a. Similarly, the non-contiguous set of tones assigned to the RU 410 for time interval 405-c may be different than the non-contiguous set of tones assigned to the RU 410 for time intervals 405-a, 405-b, or both (for example, based on the shift value).

In some aspects, the shift value may change over time (in other words, change for each time interval 405 or change for at least one time interval 405). For example, the shift value may change according to a function. In some examples, the function may include a hashing function, such as a cyclic redundancy check (CRC) hashing function. When a STA receives a frame (for example, a trigger frame) from the AP, the STA may input information from one or more fields in the frame into the hashing function to generate a hash value. The STA may then determine the shift value based on the hash value. For example, the shift value may equal the hash value or a portion of the hash value. In one specific example, the shift value may equal the N least significant bits of the hash value, in which N is an integer. The tones 420 in the non-contiguous set of tones assigned to the RU 410 may be shifted by the shift value. In this example, each STA may use the same hashing function to generate the shift value so that the tones 420 assigned to each RU allocated to the STAs are shifted by the same amount, avoiding overlapping tone assignment for multiple STAs.

In some examples, the STA may shift the tones in the non-contiguous set of tones assigned to the RU 410 each time the STA receives a trigger frame from the AP. In this example, each time the STA receives a trigger frame, the STA inputs information from one or more fields in the trigger frame into a hashing function to generate a hash value. The STA may determine the shift value based on the hash value, as described herein.

In the above example, the hashing function may provide a start index for the non-contiguous set of tones assigned to the RU 410. For example, the shift value may determine a first tone 420 in the non-contiguous set of tones assigned to the RU 410 in frequency. In the example in which each tone 420 is identified by a respective tone index, the start index may correspond to the index of the first tone (that is, the tone having the lowest frequency or the tone having the highest frequency) in the non-contiguous set of tones assigned to the RU 410 for a given time interval 405, which may be referred to as a transmission time interval (TTI).

In some aspects, the non-contiguous set of tones assigned to an RU 410 may be defined by a predetermined function that is applied by a STA. The function may include a hashing function that generates a hash value that is used to generate a shift value for shifting the assigned tones, as discussed above. In this example, the AP may transmit one or more parameter values to the STA, and the STA may input the one or more parameters values into the hashing function to generate the hash value. In this example, the one or more parameter values may be specific to the BSS of the AP so that STAs in different BSSs generate different hash values (and hence shift values) using the same hashing function. BSS specific parameters may include a BSS color, an address of the AP, any other parameter that is different for different BSSs, or any combination thereof. In some examples, the one or more parameter values may be specified in one or more fields in a trigger frame transmitted by the AP, as discussed above.

In some examples, the hash value generated by the hashing function may be used to shift the mapping of the RU. As discussed above, the RU may be mapped to a non-contiguous set of tones in the map using a set ID identifying the set of tones to which the RU is mapped. In this example, the set ID associated with the RU may be shifted based on the hash value, and the RU may be remapped to the set of tones identified by the shifted set ID. For example, if the RU is initially mapped to a set of tones identified by set ID 3 and the shift value is 4, then the RU may be remapped to the set of tones identified by set ID 7. In this example, the shift value may equal the hash value or a portion of the hash value, such as the N least significant bits of the hash function, in which N is an integer. It is to be appreciated that the present disclosure is not limited to the hashing function, and that another type of function may be used to determine the shift value.

In some aspects, each STA may store multiple functions that may be used to determine the non-contiguous set of tones assigned to an RU 410 for a given time interval 405. For example, the multiple functions may be defined by a standard and/or assigned by the AP. In some aspects, the AP may select one or more of the multiple functions and transmit an indication of the selected function(s) to the STAs. Each STA receiving the indication may use an indicated function to determine the non-contiguous set of tones assigned to the RU 410. The functions may include different functions, such as different hashing functions, for generating a shift value based on one or more parameter values.

In some aspects, the same RU may be assigned to two or more STAs concurrently. For example, an AP may assign the same RU to two STAs for concurrent uplink transmissions by assigning the same RU to the two STAs in a trigger frame. In this example, the user information fields for the two STAs may have the same RU assignment. The user field for each of the two STAs may include the AID of the respective STA.

Figures 5A, 5B:
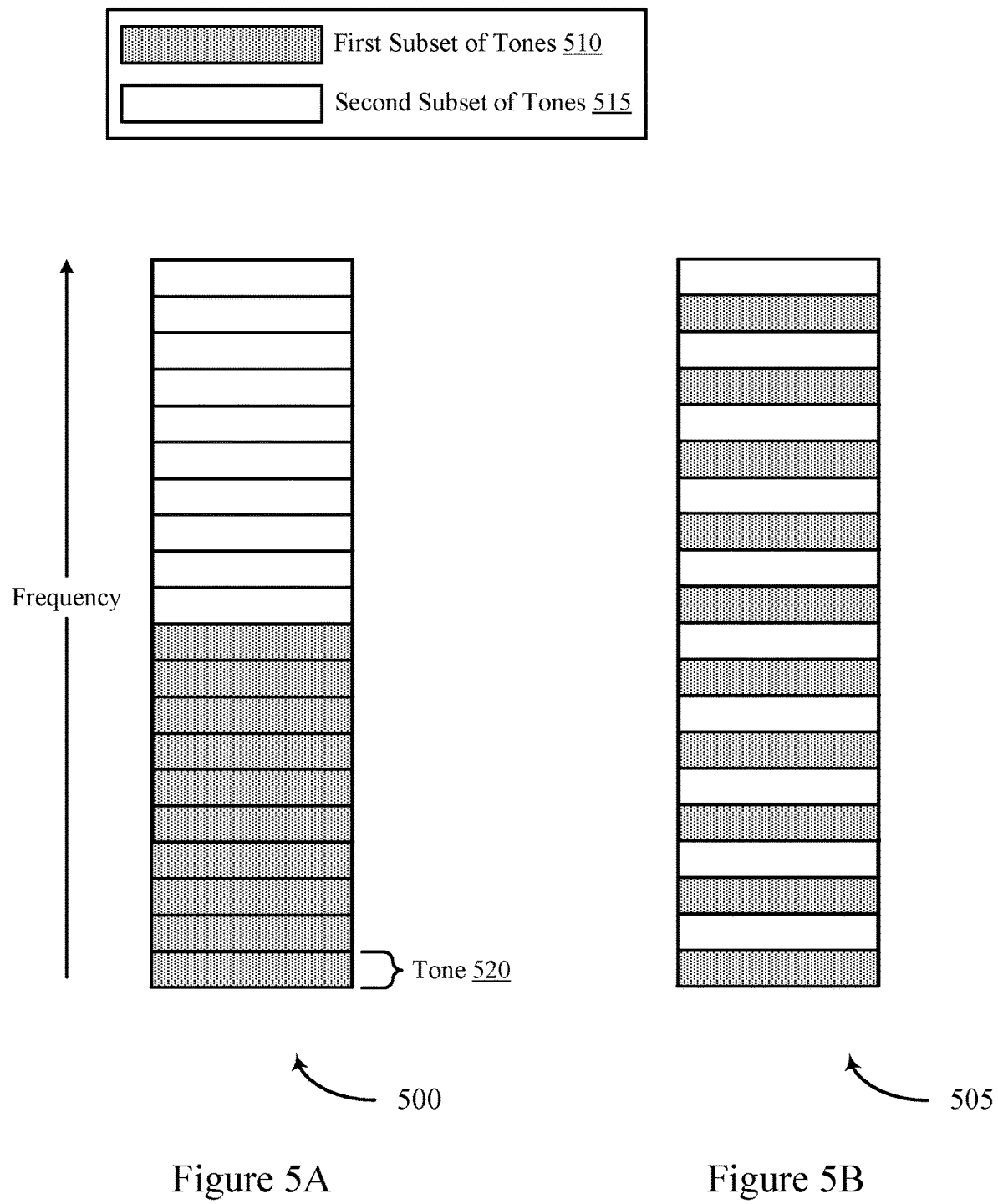
FIGS. 5A and 5B show example sets of tones for RUs that are divided into multiple subsets of tones for multiple stations (STAs).

FIG. 5A shows an example set of tones 500 for an RU that is divided into multiple subsets of tones for multiple STAs. For example, the set of tones 500 may be divided into a first subset of tones 510 and a second subset of tones 515. In these aspects, multiple STAs may share the same RU concurrently by using different subsets of the tones 520 in the set of tones 500 for the RU. In the example illustrated in FIG. 5A, the RU includes a contiguous set of tones for ease of illustration, although it is to be appreciated that the set of tones of the RU may be non-contiguous. For example, any interspersed tones between tones 520 of the set of tones 500 that are not assigned to the RU may not be illustrated in FIG. 5A for ease of illustration.

With reference to FIG. 5A, the first subset of tones 510 may include the lower half of the set of tones 500 of the RU in frequency, and the second subset of tones 515 may include the upper half of the set of tones 500 of the RU in frequency. In other examples, other tone allocations may be supported, including allocating different numbers of tones 520 to different subsets of tones (for example, based on STA priority levels, data rates, or other parameters). In one specific example of a 26-tone RU with tone indices from 1 to 26, the first subset of tones 510 may include tones 1 to 13 and the second subset of tones 515 may include tones 14 to 26. In the example shown in FIG. 5A, the first subset of tones 510 and the second subset of tones 515 are each contiguous within the set of tones 500. In some examples the first subset of tone 510 may be adjacent to the second subset of tones 515 in frequency and may not be separated by spaces occupied by tones 520 in the channel.

FIG. 5B shows an example set of tones 505 for an RU that is divided into multiple subsets of tones for multiple STAs. As configured, the set of tones 505 may alternate between the first subset of tones 510 and the second subset of tones 515. For example, the first subset of tones 510 may include every other tone in the set of tones 505 of the RU, while the second subset of tones 515 may include the remaining tones of the set of tones 505. Such a configuration may be referred to as an interleaved or "comb" allocation pattern for the set of tones 505. In the example shown in FIG. 5B, the first subset of tones 510 and the second subset of tones 515 are non-contiguous. Also, the first subset of tones 510 and the second subset of tones 515 are interspersed. It is to be appreciated that the set of tones 505 of the RU may be non-contiguous. For example, any interspersed tones between tones 520 of the set of tones 505 that are not assigned to the RU may not be illustrated in FIG. 5B for ease of illustration.

As discussed above, the AP may assign the same RU to two or more STAs by indicating the same RU to the STAs in the user information fields of a trigger frame. In this example, each STA may determine that the RU is shared by determining that the same RU is assigned in the user information fields for multiple STAs (in other words, the same RU value appears in the user information fields of multiple STAs). In this example, based on determining that the RU is shared, each STA may determine a subset of tones of the RU that is assigned to the respective STA. In some implementations, a STA may determine a subset of tones based on the order of the user information fields for the STAs in the trigger frame that share the same RU indication. For example, the STA with the user information field that appears first in the trigger frame may be assigned the first subset of tones 510, and the STA with the user information field that appears later in the trigger frame may be assigned the second subset of tones 515.

In response to the trigger frame, the STA assigned to the first subset of tones 510 may transmit uplink data via the first subset of tones 510, and the STA assigned to the second subset of tones 515 may transmit uplink data via the second subset of tones 515. The AP may receive uplink data from the STA assigned to the first subset of tones 510 via the first subset of tones 510 and may receive uplink data from the STA assigned to the second subset of tones 515 via the second subset of tones 515.

In the examples shown in FIGS. 5A and 5B, the set of tones of the RU may be contiguous for ease of illustration. It is to be appreciated that the set of tones of the RU may be non-contiguous. If non-contiguous, a STA sharing the RU with another STA may determine the non-contiguous set of tones for the RU using any of the methods discussed herein. The non-contiguous set of tones for the RU may change with time (for example, according to a pattern), as discussed herein. The STA may additionally determine the subset of the non-contiguous set of tones assigned to the STA. Based on determining the set of tones for the RU and the subset of tones within the set of tones, the STA may determine the specific tones 520 assigned to that STA. For example, if a STA is assigned a subset of tones 510 including the lower half of the tones in the non-contiguous set of tones 500 in frequency, then the STA may use the lower half of the tones for its uplink transmission(s). If a STA is assigned a subset of tones 515 including the upper half of the tones in the non-contiguous set of tones 500 in frequency, then the STA may use the upper half of the tones for its uplink transmission(s).

In some examples, the first subset of tones 510 and/or the second subset of tones 515 may change dynamically. For example, a device may change the first subset of tones 510 by shifting the tones in the first subset by a shift value and may change the second subset of tones 515 by shifting the tones in the second subset by a shift value (for example, the same shift value). In this example, the shifting may be circular and stay within the set of tones of the shared RU.

The shift value may be constant. Alternatively, the shift value may change according to a function, such as a hashing function. For the example of a hashing function, the hashing function may generate a hash value based on one or more parameter values, and the shift value may be generated based on the hash value, as discussed above. The one or more parameter values may correspond to one or more fields in a frame (for example, a trigger frame) transmitted by the AP. The AP may specify the time interval between changes in the first and/or second subsets by generating an indication of the time interval and transmitting the indication to one or more STAs. In this example, a STA may change an assigned subset of tones for each time interval or for at least one time interval.

In some aspects, the same STA may be assigned different groups of tones and through collectivity may use a larger set of tones. For example, the STA may have 13 tones from each of two groups, and collectively have 26 tones from the two groups. These different groups may be different RUs or different subsets of tones within an RU.

As described herein, RU spreading in frequency can be used to mitigate narrow band interference. If the tones of an RU are spread in frequency, the chance of all or most tones getting hit by narrow band interference is significantly reduced. Similarly, spreading a subset of tones in an RU for a particular STA may mitigate narrow band interference.

In some aspects, an AP may enable RU spreading based on the level of interference on the channel or in the tones of the RU. For example, the AP and one or more STAs may support the use of contiguous RUs and non-contiguous RUs. In this example, each STA may store a map for mapping RU assignments to contiguous sets of tones and a map for mapping RU assignments to non-contiguous sets of tones. In this example, the AP and the one or more STAs may initially use contiguous RUs for communication (for example, according to a standard). In this example, the one or more STAs may use the map for mapping RU assignments to contiguous sets of tones.

The AP may subsequently enable the use of non-contiguous RUs (in other words, enable RU spreading) based on the level of interference. For example, a STA experiencing narrow band interference may transmit a request to the AP requesting RU spreading (for example, requesting assignment of non-contiguous RUs) and/or transmit a message to the AP indicating that the STA is experiencing interference. In response, the AP may assign non-contiguous RUs to the STA (for example, in trigger frames and/or downlink transmissions). The AP may also assign non-contiguous RUs to one or more other STAs (for example, in trigger frames and/or downlink transmissions). In this example, the AP may transmit a message to the STAs indicating that the AP has enabled RU spreading. In response, the STAs may start using the map that maps RU assignments to non-contiguous sets of tones.

A STA may determine whether it is experiencing interference (for example, significant interference according to some static or dynamic interference threshold) using various methods. For example, the STA may determine that it is experiencing interference after a specific number of failed attempts to close a link between the STA and the AP. In this example, one failed attempt to close the link may occur when the STA transmits a packet to the AP and fails to receive an acknowledgement of the packet from the AP. In some examples, the STA may receive a signal, such as a pilot signal, from the AP and measure the signal-to-noise ratio (SNR), the RSSI, an error rate of the signal (for example, a bit error rate, a frame error rate, or any other error rate), and/or another parameter of the signal. In some of these examples, the STA may determine that it is experiencing interference if the SNR is below a threshold, if the RSSI is below a threshold, if the error rate is above a threshold, or if some combination of these or other interference determination methods indicate a significant level of interference at the STA. Based on the determination that the STA is experiencing interference, the STA may transmit a request to the AP requesting RU spreading (for example, requesting assignment of non-contiguous RUs) and/or transmit a message to the AP indicating that the STA is experiencing interference. In response, the AP may enable RU spreading, as discussed above.

In some aspects, a first AP and/or STA may signal another AP and/or STA in a neighboring BSS to enable RU spreading in the neighboring BSS to help the first AP and/or STA transmit reliably. For example, the first AP and/or STA may signal the second AP and/or STA in the neighboring BSS to enable RU spreading, such that devices in the neighboring BSS use non-contiguous sets of tones for RUs based on the first AP and/or STA experiencing interference. A bit in the preamble of an in-BSS PPDU or a field in another element may be used to signal the second AP and/or STA in the neighboring BSS to enable RU spreading. The neighboring BSS may be an overlapping BSS (OBSS).

Figure 6:
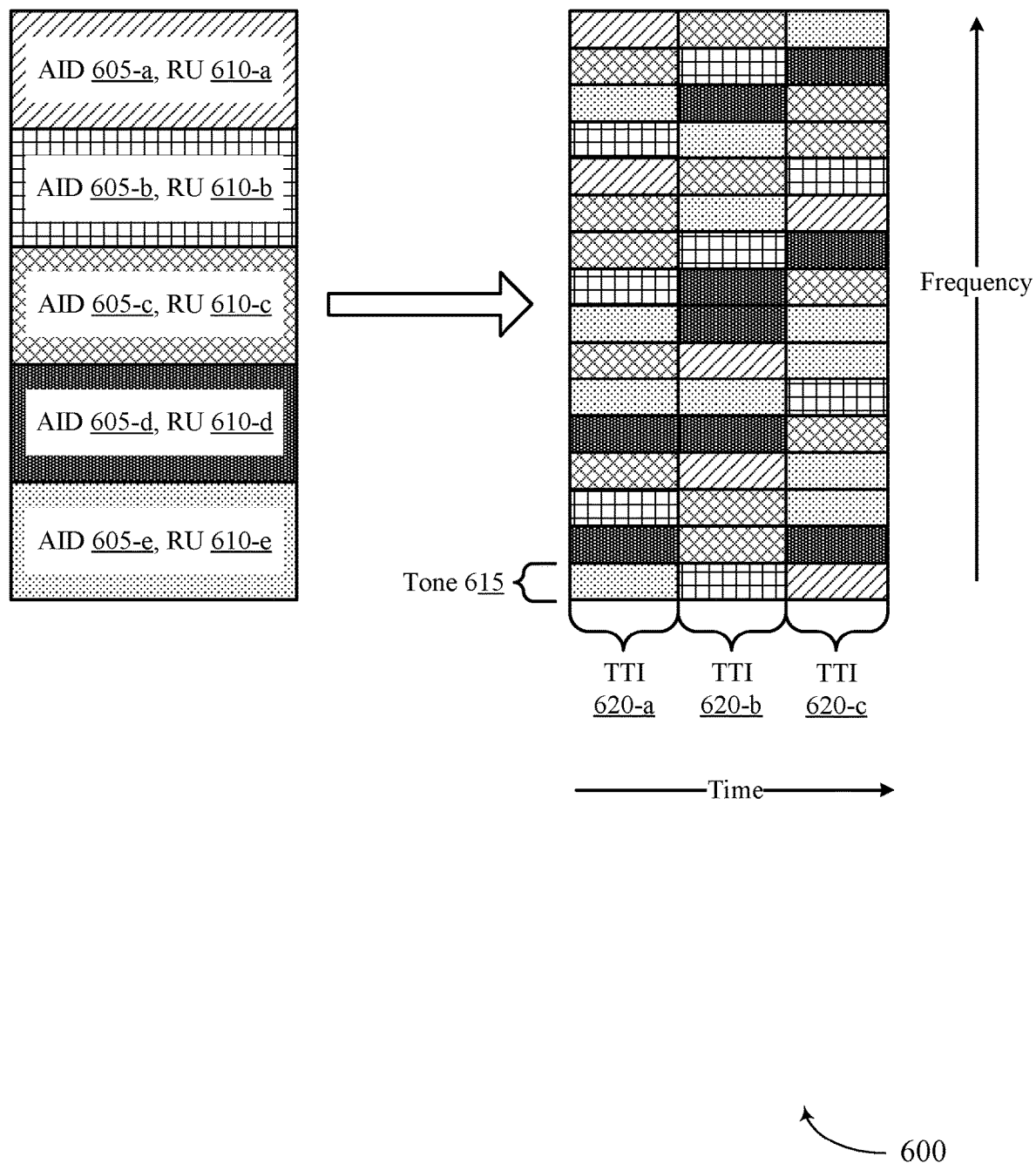
FIG. 6 shows an example of a frequency and time spreading configuration for an RU.

FIG. 6 shows an example of a frequency and time spreading configuration 600 for an RU. In the frequency and time spreading configuration 600, an RU 610 may be assigned to a STA, such as a STA described with reference to FIGS. 1 and 2. As illustrated, RU 610-a is assigned to the STA identified by AID 605-a, RU 610-b is assigned to the STA identified by AID 605-b, RU 610-c is assigned to the STA identified by AID 605-c, RU 610-d is assigned to the STA identified by AID 605-d, RU 610-e is assigned to the STA identified by AID 605-e. In some examples, RU spreading may be extended in both the frequency and time domain. As illustrated in FIG. 6, the assigned resources for each RU 610 may be non-contiguous in frequency, in time, or both. As described herein, non-contiguous may refer to each resource being non-contiguous or at least one set of resources being non-contiguous with another set of resources.

A device, such as an AP or STA, may spread an RU 610 in time by changing the non-contiguous set of tones for the RU 610 in time. In the example shown in FIG. 6, the non-contiguous set of tones for each RU 610 may change for each one of multiple TTIs 620, such as TTI 620-a, TTI 620-b, and TTI 620-c. Although three TTIs 620 are shown in FIG. 6 for ease of illustration, it is to be appreciated that there may be a larger number of TTIs 620 used for spreading one or more RUs 610. In this example, the non-contiguous set of tones for each RU may be changed using any of the methods discussed above. For example, the non-contiguous set of tones for an RU may be changed by shifting the tones 615 in the non-contiguous set of tones by a shift value for each TTI 620. The shift value may be constant or change for each TTI 620, as discussed above. In some examples, a map mapping RUs 610 to sets of tones may be changed for each TTI 620 based on a pattern and/or function, as discussed above. The RU 610 time and/or frequency mapping may be standardized, downloaded, periodic, or derived based on a function, as described herein.

In some examples, the AP may transmit a message to the STAs indicating the time duration of each TTI 620. Each STA receiving the message may change the non-contiguous set of tones for its assigned RU 610 for each TTI 620 according to the time duration indicated by the AP. The AP may transmit the message in a trigger frame, a management frame, a beacon, or any other message or signal.

In some examples, the time duration of each TTI 620 may be less than the transmission length of a packet transmitted by a STA. For example, a number of TTIs, N, may fit into the transmission length, in which N is an integer. In this example, the STA may change the non-contiguous set of tones for its assigned RU 610 N times during the uplink transmission of a packet. The same may apply to a downlink transmission from the AP to the STA.

In some aspects, redundancy may be added in the time domain to improve robustness. In some examples, aggregate MAC protocol data units (A-MPDUs) in a high efficiency (HE) (for example, downlink MU transmission or transport block (TB)) PPDU may be padded to meet a PPDU length threshold (for example, a maximum or minimum PPDU length threshold). For example, when a STA transmits an HE TB PPDU to the AP, the AP may specify the transmission length of the PPDU. If the STA does not use the entire transmission length to transmit its data, then the STA may pad the PPDU to reach the transmission length. The padding carries no useful information. In some examples, instead of padding, the contents of the PPDU may be encoded to carry redundant information to meet the length threshold. The contents may be encoded using forward error correction (FEC) (for example, fountain codes).

For example, a STA transmitting data to the AP in an uplink transmission may input the data to an encoder to generate encoded data carrying redundant information. In this example, the length of the resulting encoded data is greater than the length of the input data due to the encoded data carrying redundant information. In this example, the length of the encoded data may be selected to meet a length threshold (for example, a maximum threshold length) of a PPDU used to transmit the data. In this example, the STA may transmit the PPDU over multiple TTIs 620, and the encoded data may carry enough redundant information to enable the AP to recover the input data using less than all of the TTIs 620. This may support robust uplink transmissions, as the AP may determine the uplink data despite a narrow time interference affecting one or more TTIs 620.

In some aspects, redundancy may be added in the frequency domain to improve robustness. For example, additional tones 615 may be used to carry redundant information which can be used to help recover original content. For example, a STA transmitting data to the AP in an uplink transmission may transmit redundant information on one or more tones 615 in the set of tones for the RU 610 assigned to the STA. This may enable the AP to recover the original data using less than all of the tones 615. This may support robust uplink transmissions, as the AP may determine the uplink data despite narrow band interference affecting one or more tones 615.

In some aspects, an AP and/or STA can advertise a capability to support one or more schemes for spreading and redundancy via an element, field, or combination of fields. For example, an AP or STA may advertise its capability to support frequency spreading, time spreading, or both. An AP or STA may also advertise its encoding for mapping if different encoding schemes are available. An AP or STA may also advertise its capability to add redundancy in time (for example, padding replaced with redundant information), add redundancy in frequency (for example, some tones 615 used to carry redundant information), or both. An AP or STA can also advertise the redundancy scheme it is using if multiple redundancy schemes are supported. Any combination of the above advertising may be performed by a device, such as an AP and/or STA, by transmitting a message indicating one or more supported capabilities of the device.

Additionally or alternatively, there may be a bit which turns on or off one or more capabilities based on particular conditions. For example, redundancy may be enabled if channel quality degrades beyond a specific threshold. In some examples, RU spreading may be enabled if a subchannel is experiencing occasional or consistent interference.

Figure 7:
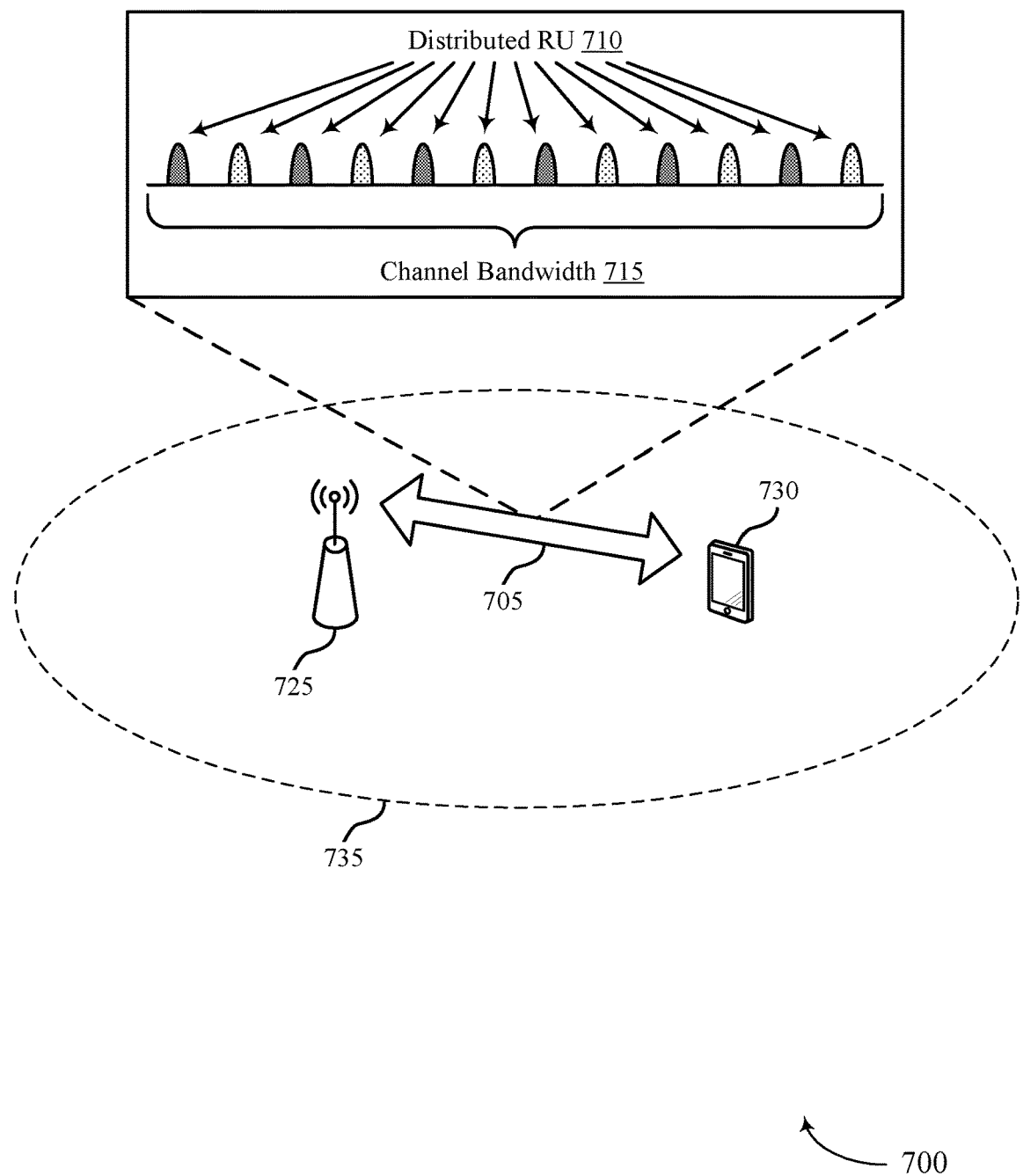
FIG. 7 shows an example of a wireless communications system.

FIG. 7 shows an example of a wireless communications system 700. The wireless communications system 700 may support RU spreading, including a configuration for distributed RUs, in accordance with aspects of the present disclosure. The wireless communications system 700 may be an example of a WLAN 100 and may include an AP 725 and a STA 730, which may be examples of the corresponding devices described with reference to FIGS. 1 and 2. The AP 725 may provide network coverage for a coverage area 735. The AP 725 and the STA 730 may communicate over communication link 705 (for example, transmitting data and/or pilot signals on the uplink or the downlink). The AP 725 and STA 730 may utilize distributed RUs 710 to improve the frequency diversity gain and the power advantage for transmissions.

Wireless communications system 700 (for example, a Wi-Fi system or WLAN) may use logical RUs as building blocks for a distributed RU 710. In some implementations, these logical RUs may span or contain 26 tones (in other words, subcarriers). In these implementations, a logical RU may be referred to as a logic RU26. A transmitting device (for example, AP 725 or STA 730) may spread the tones for a logic RU over a particular bandwidth in order to obtain a level of power advantage for the transmission. That is, the logic RU may correspond to a narrow band, and the transmitting device may spread the logic RU over a wider frequency domain. For example, an AP 725 may distribute the tones for the distributed RU 710 across a channel bandwidth 715 for transmission to a STA 730. In this example, the aggregate bandwidth for the tones is less than the channel bandwidth 715. In some examples, the size of the channel bandwidth 715 for distribution may be based on a power advantage threshold, referred to as the full power advantage. This full power advantage may correspond to transmitting with a maximum transmit power or peak power, while still remaining below a PSD limit for the system. The bandwidth supporting the full power advantage may be calculated using the following equation:

$$\text{Full Power } Adv.\ BW = \frac{\text{Peak Power}}{PSD \text{ Limit}} = 10 \left[ \frac{24 \text{ dBm} - 11 \text{ dBm/MHz}}{10} \right] \approx 20 \text{ MHz}, \quad (1)$$

in which the peak power is 24 decibel-milliwatts (dBm) and the PSD limit is 11 dBm per megahertz (MHz). As indicated by this equation, to transmit using the peak power while supporting the PSD limit, a device may spread the transmission over a bandwidth of approximately 20 MHz. This peak power, PSD limit, and bandwidth are given as examples, and other values may be used for distributing RUs.

In some implementations, a transmitting device may use an RU size greater than the logic RU size (for example, RU26) or a threshold RU size (for example, RU106). Additionally or alternatively, the transmitting device may map the distributed RU 710 over a channel bandwidth 715 greater than the bandwidth supporting the full power advantage (for example, 20 MHz). In some examples, the transmission may experience a reduced power gain or no power gain based on the wider bandwidth or RU size, as well as a reduced frequency diversity gain. However, any amount of RU distribution for a transmission may harvest frequency diversity gain and transmit power advantage. These advantages may be especially significant for uplink transmissions (for example, data and/or pilot transmissions from the STA 730 to the AP 725).

A minimum mapping distance (for example, to achieve the full power advantage) may depend on the logic RU size for the channel bandwidth 715. For example, to support RU26 and 1 tone/MHz for evenly spreading tones, the minimum corresponding channel bandwidth 715 may be approximately 26 MHz.

Described below is one possible distributed RU 710 design utilizing tone sets 720 for efficient distribution across a channel bandwidth 715. The description focuses on an RU26 containing 24 data tones and 2 pilot tones spread over RU242 (for example, a channel bandwidth 715 of approximately 20 MHz). However, other RUs, channel bandwidths 715, and distribution designs are possible and supported by wireless communications system 700 as described herein.

The distributed RU 710 may contain a number of tones with an aggregate bandwidth (for example, 26 tones) that is less than the channel bandwidth 715 (for example, 242 tones). The transmitting device may map these 26 RU tones to tones within the channel bandwidth 715. A majority of the tones (for example, at least 90% of the tones) may be mapped to distributed pairs of adjacent tones in the channel bandwidth 715. That is, the channel bandwidth 715 may contain groups of tones with 2 tones in each group, and each RU may correspond to one or more of these groups. In some examples, these distributed pairs of adjacent tones may be used as data tones for the distributed RU 710. Additionally, the distributed RU 710 may contain pilot tones. These pilot tones may be non-contiguous or may be separated by at least a threshold number of tones. At least two pilot tones for each RU may be mapped to tones far apart in the channel bandwidth 715 (for example, the pilot tones are separated by at least 30% of the channel bandwidth 715, at least 50% of the channel bandwidth 715, or some other separation threshold). In some examples, a device may determine the set of tones allocated for the distributed RU 710 and may remap which tones within the allocated set of tones are data tones and which tones are pilot tones.

One example of a distribution design for RUs utilizes tone sets 720. In some implementations, these tone sets 720 may correspond to tone sets for null data packet (NDP) short feedback (see Table 1).

TABLE 1

Example Tone Sets for RU Distribution

| Tone Sets | b = 1 | b = 0 |
|---|---|---|
| 1 | −113, −77, −41, 6, 42, 78 | −112, −76, −40, 7, 43, 79 |
| 2 | −111, −75, −39, 8, 44, 80 | −110, −74, −38, 9, 45, 81 |
| 3 | −109, −73, −37, 10, 46, 82 | −108, −72, −36, 11, 47, 83 |
| 4 | −107, −71, −35, 12, 48, 84 | −106, −70, −34, 13, 49, 85 |
| 5 | −105, −69, −33, 14, 50, 86 | −104, −68, −32, 15, 51, 87 |
| 6 | −103, −67, −31, 16, 52, 88 | −102, −66, −30, 17, 53, 89 |
| 7 | −101, −65, −29, 18, 54, 90 | −100, −64, −28, 19, 55, 91 |
| 8 | −99, −63, −27, 20, 56, 92 | −98, −62, −26, 21, 57, 93 |
| 9 | −97, −61, −25, 22, 58, 94 | −96, −60, −24, 23, 59, 95 |
| 10 | −95, −59, −23, 24, 60, 96 | −94, −58, −22, 25, 61, 97 |

TABLE 1-continued

Example Tone Sets for RU Distribution

| Tone Sets | b = 1 | b = 0 |
|---|---|---|
| 11 | −93, −57, −21, 26, 62, 98 | −92, −56, −20, 27, 63, 99 |
| 12 | −91, −55, −19, 28, 64, 100 | −90, −54, −18, 29, 65, 101 |
| 13 | −89, −53, −17, 30, 66, 102 | −88, −52, −16, 31, 67, 103 |
| 14 | −87, −51, −15, 32, 68, 104 | −86, −50, −14, 33, 69, 105 |
| 15 | −85, −49, −13, 34, 70, 106 | −84, −48, −12, 35, 71, 107 |
| 16 | −83, −47, −11, 36, 72, 108 | −82, −46, −10, 37, 73, 109 |
| 17 | −81, −45, −9, 38, 74, 110 | −80, −44, −8, 39, 75, 111 |
| 18 | −79, −43, −7, 40, 76, 112 | −78, −42, −6, 41, 77, 113 |

For a channel bandwidth 715 spanning RU242, the system may support 18 tone sets 720, in which each tone set 720 includes 12 distributed tones. The tones included in at least one of the tone sets 720 may be used as data tones. For example, based on the tone sets 720 presented in Table 1, the data tone indices may include: [−113:−6, 6:113]. In this example, the bandwidth spanning 242 tones may contain 216 tones in a data portion. As each tone set 720 contains 12 tones, a device may use two tone sets 720 to form 24 data tones for one distributed RU 710 (for example, an RU26). This may allow the system to support nine RU26 distributed in the channel bandwidth 715. For example, with reference to Table 1, the devices may support a first RU26 containing the tones associated with tone sets 1 and 10, a second RU26 containing the tones associated with tone sets 2 and 11, and so on, up to a ninth RU26 containing the tones associated tone sets 9 and 18. For the distributed RU 710, the AP 725 or STA 730 may transmit over data tones for RU26 corresponding to tone sets 720-*a* and 720-*b*. If tone set 720-*a* corresponds to tone set 1 of Table 1 and tone set 720-*b* corresponds to tone set 10 of Table 1, the AP 725 or STA 730 may transmit data in 24 data tones with tone indices −113, −112, −95, −94, −77, −76, −59, −58, −41, −40, −23, −22, 6, 7, 24, 25, 42, 43, 60, 61, 78, 79, 96, and 97. These 24 data tones are made up of 12 pairs of adjacent tones in the channel bandwidth 715 (for example, spread across the frequency domain).

The transmitting device may additionally transmit pilot signals in multiple pilot tones in addition to the data tones. The device may allocate these pilot tones to available tones in the channel bandwidth 715 (for example, tones not occupied by data tones for any of the tone sets 720). The pilot tones may be mapped towards the edges of the channel bandwidth 715, towards the center of the channel bandwidth 715, or split between the two. In some implementations, the locations for the pilot tones may be based on a number of extra edge tones or DC tones to maintain. For example, to maintain a reservation of 7 DC tones for orthogonal frequency division multiple access (OFDMA) in the center of the channel bandwidth 715 (for example, DC tones [−3:3]), the device may allocate the pilot tones (for example, 18 pilot tones, two each for 9 RUs) such that the pilot tone indices include: [−120:−114, −5:−4, 4:5, 114:120]. This may also leave some unused tones on each edge of the channel bandwidth 715 for interference cancelation. This may leave 8 edge tones on the left-hand side of the channel bandwidth 715 and 7 edge tones on the right-hand side.

In some implementations, the above allocations may be shifted in frequency. For example, to handle edge tone thresholds or tone availability for some bandwidths (for example, 40 or 80 MHz), a device may shift the data and pilot tones by a number of tones (for example, 4 tones for RU26 or 6 tones for RU106) to align with the edges of the specific bandwidth. This may involve shifting tones on either side of the channel bandwidth 715 towards the DC tones in the center of the channel bandwidth 715. In some examples, the device may use a regular 128 or 384 tone shift for the transmission.

One example of a specific pilot tone allocation rule may involve sequentially allocating one pilot to a negative tone index and one pilot to a positive tone index to form a set of two pilot tones for a distributed RU 710. For example, if the pilot portion of the channel bandwidth 715 spans [−120:−114, −5:−4, 4:5, 114:120], a first set of pilot tones may contain pilot tone index −120 and pilot tone index 4 (in other words, the first available negative pilot tone and the first available positive pilot tone in sequence). Using such a rule may ensure that the two pilot tones for a logic RU26 are far apart (for example, around 50% of the bandwidth from one another). Using this pilot tone allocation rule and the tone set 720 allocation design described above, the channel bandwidth 715 may support nine logic RUs as defined below in Table 2:

TABLE 2

Example Tone Distribution for Logic RU26 in Option 1

Physical Tone Indices/Tone Sets belonging to corresponding logic RU26
Logic RU26 Index

| | 1 | 2 | 3 | 4 | 5 | 6 | 7 | 8 | 9 |
|---|---|---|---|---|---|---|---|---|---|
| Data Tones (Tone Sets) | 1, 10 | 2, 11 | 3, 12 | 4, 13 | 5, 14 | 6, 15 | 7, 16 | 8, 17 | 9, 18 |
| Pilot Tones (Tone Indices) | −120, 4 | −119, 5 | −118, 114 | −117, 115 | −116, 116 | −115, 117 | −114, 118 | −5, 119 | −4, 120 |

Table 2 describes one possible data and pilot tone allocation for RU distribution. Many other tone allocations are possible, and each tone allocation may distribute a set of tones across a channel bandwidth 715 that is wider than an aggregate bandwidth of the set of tones. A majority of tones of the set of tones may be allocated to distributed pairs of adjacent tones.

Additionally or alternatively, how the RUs are distributed may be based on other factors. For example, the type of data or format of the data to be transmitted in the distributed RU 710 may determine the allocation of tones or the data mapping for the distributed RU 710. Uncompressed long training fields (LTFs) such as 4× LTF may transmit data in each data tone of the sets of data tones. However, compressed LTFs (for example, LTFs with a tone group factor, Ng, greater than 1, such as 1× or 2× LTFs) may transmit one value over a set of tones. For example, 2× LTF may transmit one value over a set of two tones. In these implementations, the transmitting device may support 2× LTF by transmitting one data tone in each pair of adjacent data tones. The transmitting device may additionally transmit pilot signals on all distributed pilot tones. In some other implementations, the devices may not use compressed LTFs, and may limit transmissions to uncompressed 4× LTFs. For short training fields (STFs), the wireless communications system 700 may implement an existing 20 MHz STF for any devices in each 20 MHz channel bandwidth 715 in OFDMA. For example, for trigger-based STFs, a transmitting device may transmit data in every eighth data tone, while for non-trigger-based STFs, the transmitting device may transmit data in every sixteenth data tone.

In some implementations, a device allocating resources for distributed RUs 710 in the channel bandwidth 715 may perform interleaving of the resources using existing interleaving methods for non-distributed transmissions. However, in some other implementations, the distribution procedure may provide sufficient frequency diversity to the transmissions, and the device may not perform interleaving.

Additionally or alternatively, a device may utilize RUs of different sizes in the channel bandwidth 715. The device may unify tone mapping over the channel bandwidth 715 (for example, including pilot tones) despite the mixed RU sizes. Also, when allocating distributed RUs to devices (for example, one or more STAs), the ordering of the devices may not be important due to the distribution of the RUs.

Figure 8:
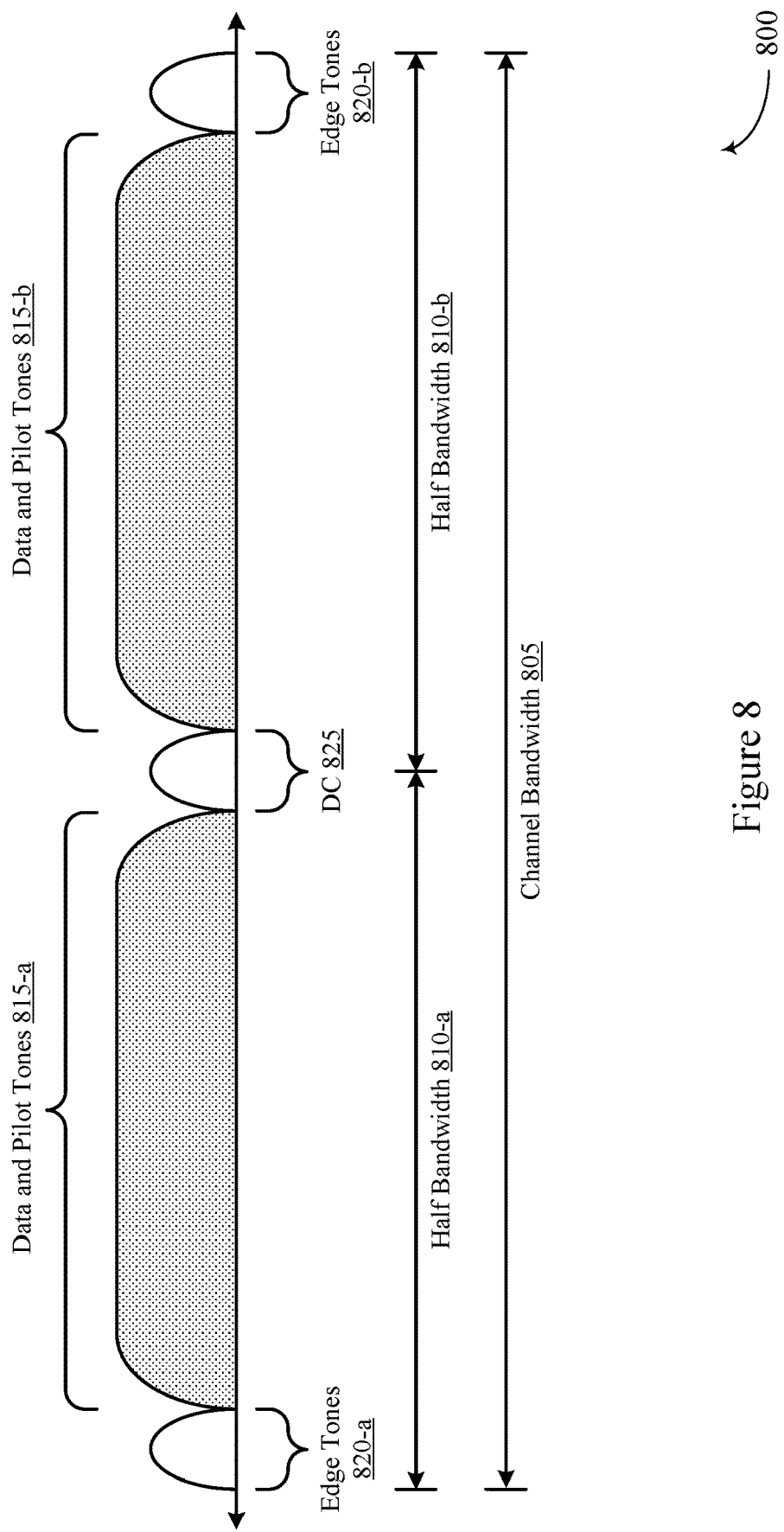
FIG. 8 shows an example of a channel bandwidth configuration.

FIG. 8 shows an example of a channel bandwidth configuration 800. The channel bandwidth configuration 800 may define possible tone allocations for a channel bandwidth 805, which may be an example of a channel bandwidth 715 described with reference to FIG. 7. The channel bandwidth configuration 800 may support transmission of data and pilot tones 815 distributed across the channel bandwidth 805 for a number of RUs.

The channel bandwidth 805 may include a set of useful tones (for example, tones carrying information, such as data or pilot signals) and a set of unused or extra tones (for example, tones not carrying information). These unused tones may act as a buffer or may be used for interference cancelation. Data and pilot tones 815-a and 815-b may be examples of useful tones, and edge tones 820-a and 820-b and DC tones 825 may be examples of unused tones. In some implementations, edge tones 820-a may be referred to as leading unused edge tones and edge tones 820-b may be referred to as following or trailing unused edge tones.

The DC tones 825 may span a number of tones in the center of the channel bandwidth 805. The channel bandwidth 805 may include two half bandwidths, a negative half bandwidth 810-a and a positive half bandwidth 810-b. In each half bandwidth 810, the system or devices may allocate a set of data and pilot tones 815 bordered by unused tones (for example, edge tones 820 and a portion of the DC tones 825). The data and pilot tones 815 may include tones allocated for different distributed RUs. For example, the majority of the tones in the data and pilot tones 815 may be examples of paired adjacent tones. In some examples, the data tones may be paired adjacent tones, while the pilot tones may not be. Example mappings of the data tones and pilot tones within the sets of data and pilot tones 815 are discussed below, with reference to FIGS. 9A, 9B, and 9C.

Figure 9A:
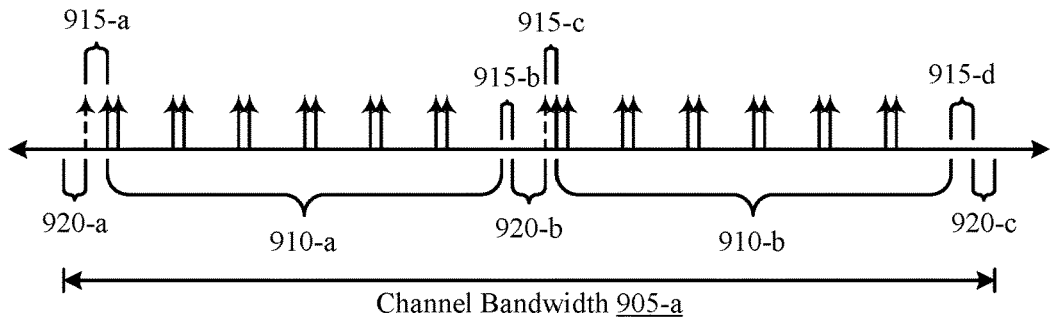
FIGS. 9A, 9B, and 9C show examples of tone mapping configurations.
Figure 9B:
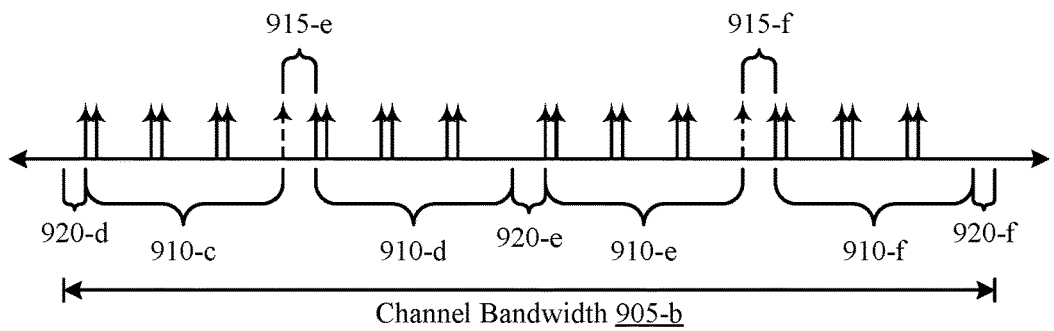
Figure 9C:
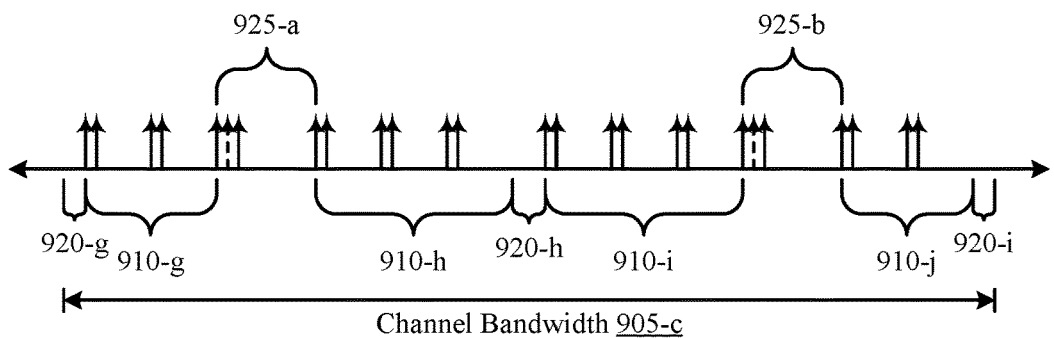

FIGS. 9A, 9B, and 9C show examples of tone mapping configurations 900. The tone mapping configurations 900 support RU spreading, including distributing RUs across channel bandwidths 905 in accordance with aspects of the present disclosure. In FIG. 9A, tone mapping configuration 900-a illustrates a first option for data and pilot tone mapping for a distributed RU. The channel bandwidth 905-a may include unused tones 920 (for example, including unused edge tones 920-*a* and 920-*c*, and unused DC tones 920-*b*) and useful tones. These useful tones may include data portions 910 and pilot portions 915. These data portions 910 and pilot portions 915 may include allocated tones for a number of different RUs. As illustrated, data tones 930 and pilot tones 935 may be allocated for a first distributed RU. For example, the distributed RU may be an example of an RU26 and may include 24 data tones 930 and 2 pilot tones 935. These pilot tones 935 may be mapped to tones that are far apart in the channel bandwidth 905-*a* (for example, at least 30% of the bandwidth apart). The distributed RU illustrated in FIG. 9A may be an example of logic RU26 1 as defined with respect to Table 2. In this first option, the pilot tones 935 may be mapped to either edge of the data portions 910 in each half bandwidth of the channel bandwidth 905-*a*. For example, each logic RU may include at least one pilot tone 935 in either the leading pilot portion 915-*a* or trailing pilot portion 915-*b* for the first data portion 910-*a* and at least one other pilot tone 935 in either the leading pilot portion 915-*c* or trailing pilot portion 915-*d* for the second data portion 910-*b*.

In FIG. 9B, tone mapping configuration 900-*b* illustrates a second option for data and pilot tone mapping for a distributed RU. In tone mapping configuration 900-*b*, as opposed to tone mapping configuration 900-*a*, the systems or devices may shift the data portions 910 towards the edges of each half bandwidth (for example, towards the edge tones and DC tones), and the pilot portions 915 may be mapped to the middle of each half bandwidth. For example, as with tone mapping configuration 900-*a*, the channel bandwidth 905-*b* for tone mapping configuration 900-*b* may include the same or similar unused tones 920 (for example, including unused edge tones 920-*d* and 920-*f*, and unused DC tones 920-*e*). However, in this second option, a pilot portion 915 may be centered in each half bandwidth, and the data portions 910 may surround these pilot portions 915. For example, for distributing logic RUs with 26 tones (for example, 24 data tones and 2 pilot tones) in a 20 MHz bandwidth, the channel bandwidth 905-*b* may support 9 distributed logic RUs. Each half bandwidth in the channel bandwidth 905-*b* may include 9 pilot tones 935 centered in that half bandwidth, and each logic RU may have one pilot tone 935 in each of the half bandwidths. In these examples, the data portions 910 may be allocated to the remaining useful tones in the channel bandwidth 905-*b*. Example data tones 930 and pilot tones 935 corresponding to each distributed RU supported by the channel bandwidth 905-*b* are presented in Table 3 below:

TABLE 3

Example Tone Distribution for Logic RU26 in Option 2

| Logic RU26 Index | Mapped Tone Index (Pilot Tones Italicized) |
|---|---|
| 1 | −120, −119; −102, −101; −84, −83; *−66*; −57, −56; −39, −38; −21, −20; 4, 5; 22, 23; 40, 41; *58*; 67, 68; 85, 86; 103, 104 |
| 2 | −118, −117; −100, −99; −82, −81; *−65*; −55, −54; −37, −36; −19, −18; 6, 7; 24, 25; 42, 43; *59*; 69, 70; 87, 88; 105, 106 |
| 3 | −116, −115; −98, −97; −80, −79; *−64*; −53, −52; −35, −34; −17, −16; 8, 9; 26, 27; 44, 45; *60*; 71, 72; 89, 90; 107, 108 |
| 4 | −114, −113; −96, −95; −78, −77; *−63*; −51, −50; −33, −32; −15, −14; 10, 11; 28, 29; 46, 47; *61*; 73, 74; 91, 92; 109, 110 |
| 5 | −112, −111; −94, −93; −76, −75; *−62*; −49, −48; −31, −30; −13, −12; 12, 13; 30, 31; 48, 49; *62*; 75, 76; 93, 94; 111, 112 |
| 6 | −110, −109; −92, −91; −74, −73; *−61*; −47, −46; −29, −28; −11, −10; 14, 15; 32, 33; 50, 51; *63*; 77, 78; 95, 96; 113, 114 |

TABLE 3-continued

Example Tone Distribution for Logic RU26 in Option 2

| Logic RU26 Index | Mapped Tone Index (Pilot Tones Italicized) |
|---|---|
| 7 | −108, −107; −90, −89; −72, −71; *−60*; −45, −44; −27, −26; −9, −8; 16, 17; 34, 35; 52, 53; *64*; 79, 80; 97, 98; 115, 116 |
| 8 | −106, −105; −88, −87; −70, −69; *−59*; −43, −42; −25, −24; −7, −6; 18, 19; 36, 37; 54, 55; *65*; 81, 82; 99, 100; 117, 118 |
| 9 | −104, −103; −86, −85; −68, −67; *−58*; −41, −40; −23, −22; −5, −4; 20, 21; 38, 39; 56, 57; *66*; 83, 84; 101, 102; 119, 120 |

In this second tone allocation option, a first data portion 910-*c* may border the leading edge tones 920-*d* and a second data portion 910-*d* may border the DC tones 920-*e*, with a contiguous first pilot portion 915-*e* located in the tones between these data portions 910-*c* and 910-*d*. Similarly, in the other half bandwidth (for example, the positive half bandwidth), a third data portion 910-*e* may border the DC tones 920-*e* and a fourth data portion 910-*f* may border the trailing edge tones 920-*f*, with the second pilot portion 915-*f* inserted between these data portions 910-*e* and 910-*f*. This tone mapping configuration 900-*b* may support even spacing for separation of the pilot tones 935 composing a same RU26.

In the tone mapping configuration 900-*b*, extra tones may be allocated to the unused tones 920 (for example, two tones on each side of the edge tones 920-*d* and 920-*f*, and two tones on each side of the DC tones 920-*e*). Accordingly, the useful tones may span tone indices [−120,−4]∪[4,120], supporting 234 useful tones, with tone indices [−66,−58]∪[58,66] designated as pilot tones. Each RU26 may contain subgroups of data tones, in which each subgroup includes two contiguous tones (for example, tone indices −120 and −119 may form a first data subgroup for logic RU 1). These pairs of adjacent or contiguous tones may result in a smoothing gain for channel estimation performed on the channel bandwidth 905-*b*. As the pilot tones 935 for the RUs are scattered (for example, spread or distributed) in the middle of each half bandwidth (for example, for improved frequency diversity of the pilots), a receiving device may perform channel estimation independently on the pilot signals and without a corresponding interpolation process. For example, an AP or STA may perform separate channel estimation due to the separation of each pair of data tones 930 for a given RU from the pilot tones 935 for that RU.

In FIG. 9C, tone mapping configuration 900-*c* illustrates a third option for data and pilot tone mapping for a distributed RU. In tone mapping configuration 900-*c*, pilot tones 935 for each RU connect a pair of data tones 930 for that RU. As with tone mapping configuration 900-*b*, tone mapping configuration 900-*c* includes extra tones allocated to unused tones 920 (for example, two tones on each side of the edge tones 920-*g* and 920-*i*, and two tones on each side of the DC tones 920-*h*). Accordingly, the useful tones may span tone indices [−120,−4]∪[4,120], supporting 234 useful tones. Each RU26 may contain subgroups of data tones. A majority of these subgroups may include two contiguous data tones 930 (for example, to support smoothing gain for channel estimation). However, at least one subgroup in each half bandwidth may include a pilot tone 935 connecting the data tones 930 in the subgroup. In one specific example, a pilot tone 935 may be mapped to the middle of the third subgroup of data tones 930 from the edge in each half bandwidth. This may result in improved frequency diversity, and a receiving device may utilize interpolation from the received data tones to the pilot tone based on the pilot tones 935 being adjacent to data tones 930 in the distributed RU. In these examples, the receiving device may not perform an independent channel estimation procedure on pilot tones.

FIG. 9C illustrates one example of a connected pilot configuration. For example, the channel bandwidth 905-*c* may include the same or similar unused tones 920 (for example, including unused edge tones 920-*g* and 920-*i*, and unused DC tones 920-*h*) as tone mapping configurations 900-*a* and 900-*b*. The channel bandwidth 905-*c* may include allocated data portions 910 but may not contain contiguous pilot portions. Instead, the channel bandwidth 905-*c* may include data-pilot connection portions 925-*a* and 925-*b*. Each of these portions may include a data subgroup containing a pilot tone 935 bordered on either side by a data tone 930 for each logic RU. For example, for distributed logic RUs with 26 tones (for example, 24 data tones and 2 pilot tones) in a 20 MHz bandwidth, the data-pilot connection portion 925-*a* may include nine sets of subgroups—one for each supported logic RU—in which each subgroup contains a data tone, a pilot tone, and another data tone in sequence. The data-pilot connection portion 925-*b* may include a similar configuration of connected data and pilot tones, such that each logic RU contains a pilot tone 935 connected to data tones 930 for that logic RU in each half bandwidth of the channel bandwidth 905-*c*. The other data subgroups (for example, composing data portions 910-*g*, 910-*h*, 910-*i*, and 910-*j*) may contain paired adjacent data tones 930 for the distributed RUs. Table 4 defines one specific tone index mapping for connected pilots, in accordance with tone mapping configuration 900-*c*.

TABLE 4

Example Tone Distribution for Logic RU26 in Option 3

Logic RU26 Index Mapped Tone Index (Pilot Tones Italicized)

| | |
|---|---|
| 1 | −120, −119; −102, −101; −84, *−83*, −82; −57, −56; −39, −38; −21, −20; 4, 5; 22, 23; 40, 41; 58, *59*, 60; 85, 86; 103, 104 |
| 2 | −118, −117; −100, −99; −81, *−80*, −79; −55, −54; −37, −36; −19, −18; 6, 7; 24, 25; 42, 43; 61, *62*, 63; 87, 88; 105, 106 |
| 3 | −116, −115; −98, −97; −78, *−77*, −76; −53, −52; −35, −34; −17, −16; 8, 9; 26, 27; 44, 45; 64, *65*, 66; 89, 90; 107, 108 |
| 4 | −114, −113; −96, −95; −75, *−74*, −73; −51, −50; −33, −32; −15, −14; 10, 11; 28, 29; 46, 47; 67, *68*, 69; 91, 92; 109, 110 |
| 5 | −112, −111; −94, −93; −72, *−71*, −70; −49, −48; −31, −30; −13, −12; 12, 13; 30, 31; 48, 49; 70, *71*, 72; 93, 94; 111, 112 |
| 6 | −110, −109; −92, −91; −69, *−68*, −67; −47, −46; −29, −28; −11, −10; 14, 15; 32, 33; 50, 51; 73, *74*, 75; 95, 96; 113, 114 |
| 7 | −108, −107; −90, −89; −66, *−65*, −64; −45, −44; −27, −26; −9, −8; 16, 17; 34, 35; 52, 53; 76, *77*, 78; 97, 98; 115, 116 |
| 8 | −106, −105; −88, −87; −63, *−62*, −61; −43, −42; −25, −24; −7, −6; 18, 19; 36, 37; 54, 55; 79, *80*, 81; 99, 100; 117, 118 |
| 9 | −104, −103; −86, −85; −60, *−59*, −58; −41, −40; −23, −22; −5, −4; 20, 21; 38, 39; 56, 57; 82, *83*, 84; 101, 102; 119, 120 |

For uplink transmissions, the system may allocate pilot tones 935 such that pilot signals for each user (for example, each STA) are evenly spread over the channel bandwidth 905. For downlink or single-user transmissions, the system may spread the pilot tones 935 for different logic RUs so that common pilot signals (for example, pilots for downlink or single-user applications) provide greater frequency diversity than dedicated pilots in a resource block.

While the configurations and designs are described above with respect to logic RU26s, other sizes of RUs are supported. In some examples, these other RU sizes may be based on a smaller sized logic RU. For example, to support distributed RUs with 52 tones, each logic RU52 may be composed of two logic RU26s (for example, the logic RU26s may be defined according to any of the tone mapping configurations 900 described above). In one specific example, a logic RU52 may be formed using the distributed physical tones for two neighboring logic RU26s. Table 5 describes such a configuration:

TABLE 5

Logic RU26 Indices Belonging to Corresponding Logic RU52s

| | RU52 Logic Index | | | |
|---|---|---|---|---|
| | 1 | 2 | 3 | 4 |
| Covered Logic RU26 Indices | 1, 2 | 3, 4 | 6, 7 | 8, 9 |

In such a configuration, one or more logic RU26s may be excluded in larger RU mapping (for example, logic RU26 5).

Similarly, to support distributed RUs with 106 tones, each logic RU106 may be composed of four logic RU26s. In one specific example, a logic RU106 may be formed using the distributed physical tones for four neighboring logic RU26s, along with two additional tones (for example, edge tones, DC tones, and/or tones from a dropped logic RU26, such as logic RU26 5). In some other examples, the logic RU106 may be formed using tones for even or odd indexed logic RU26s. Each logic RU106 may include 102 data tones and 4 pilot tones. Accordingly, four pilot tones of the four RU26s composing the RU106 may be used as data tones to support RU106 distribution. Table 6 describes one such possible configuration for distributed RU106 tone locations:

TABLE 6

Logic RU26 Indices and Physical Tone Indices Belonging to Corresponding Logic RU106s

| | RU106 Logic Index | |
|---|---|---|
| | 1 | 2 |
| Covered Logic RU26 Indices | 1, 2, 3, 4 | 6, 7, 8, 9 |
| Covered Edge Tone Indices | −122, −121 | 121, 122 |
| Pilot Tones Switched to Data Tones | −120, −118, 4, 114 | −114, −4, 118, 120 |

Figure 10:
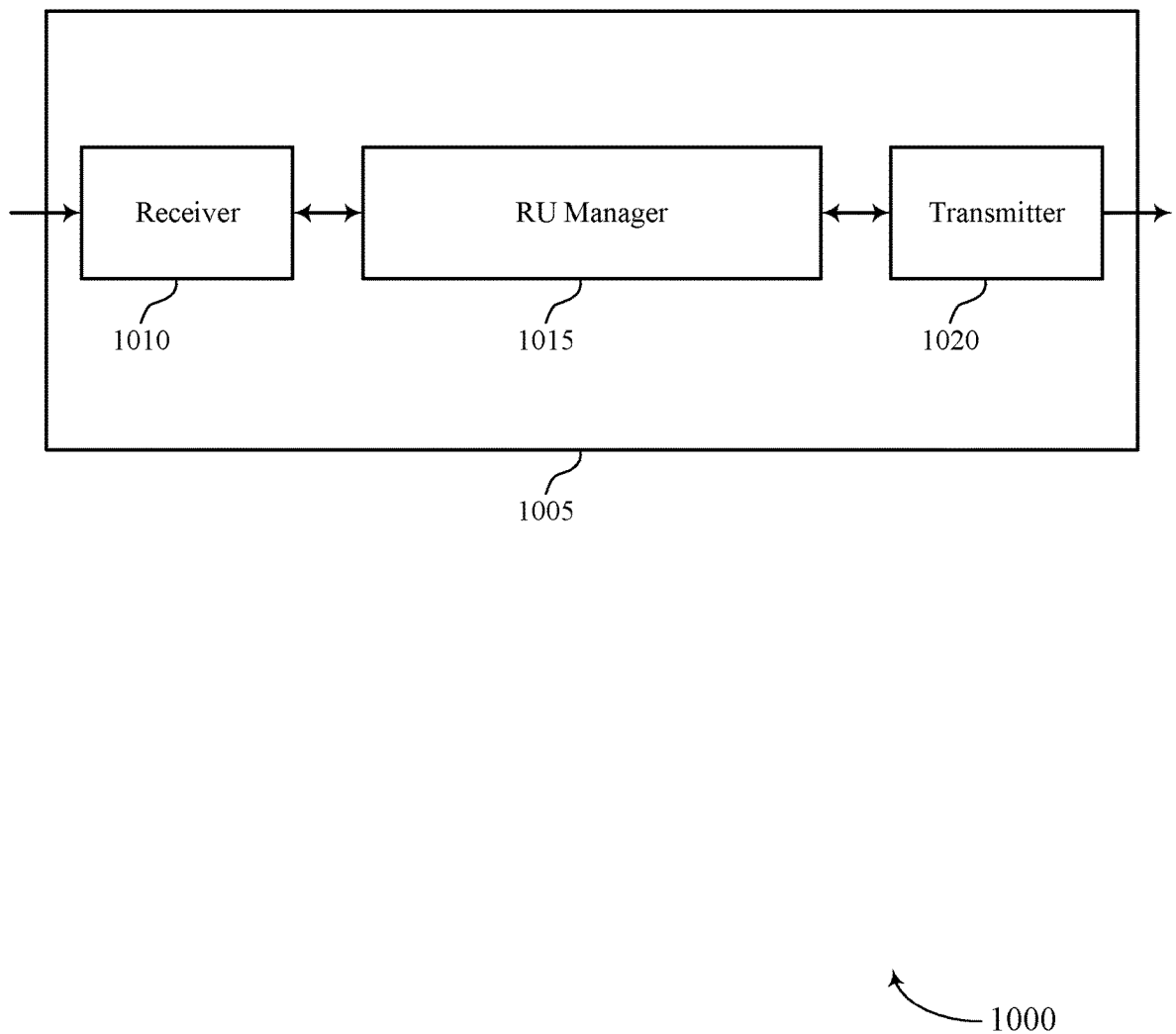
FIGS. 10 and 11 show block diagrams of example wireless communication devices.

FIG. 10 shows a block diagram 1000 of an example wireless communication device 1005. The device 1005 may be an example of aspects of an AP as described herein. The device 1005 may include a receiver 1010, an RU manager 1015, and a transmitter 1020. The RU manager 1015 can be implemented, at least in part, by one or both of a modem and a processor. Each of these components may be in communication with one another, for example, via one or more buses.

The receiver 1010 may receive information such as packets, user data, or control information associated with various information channels, such as control channels, data channels, and information related to RU spreading. Information may be passed on to other components of the device. The receiver 1010 may be an example of aspects of the transceiver 1320 described with reference to FIG. 13. The receiver 1010 may utilize a single antenna or a set of antennas.

The RU manager 1015 may assign a first RU to a first wireless node, in which the first RU includes a first non-contiguous set of tones of a channel, generate a first indicator indicating the first RU, output the first indicator for transmission, and obtain data from the first wireless node via the first RU. The RU manager 1015 may be an example of aspects of the RU manager 1310 described herein.

The RU manager 1015, or its sub-components, may be implemented in hardware, code (software or firmware) executed by a processor, or any combination thereof. If implemented in code executed by a processor, the functions of the RU manager 1015, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The RU manager 1015, or its sub-components, may be physically located at different locations, including being distributed such that portions of functions are implemented at different physical locations by one or more physical components.

The transmitter 1020 may transmit signals generated by other components of the device. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
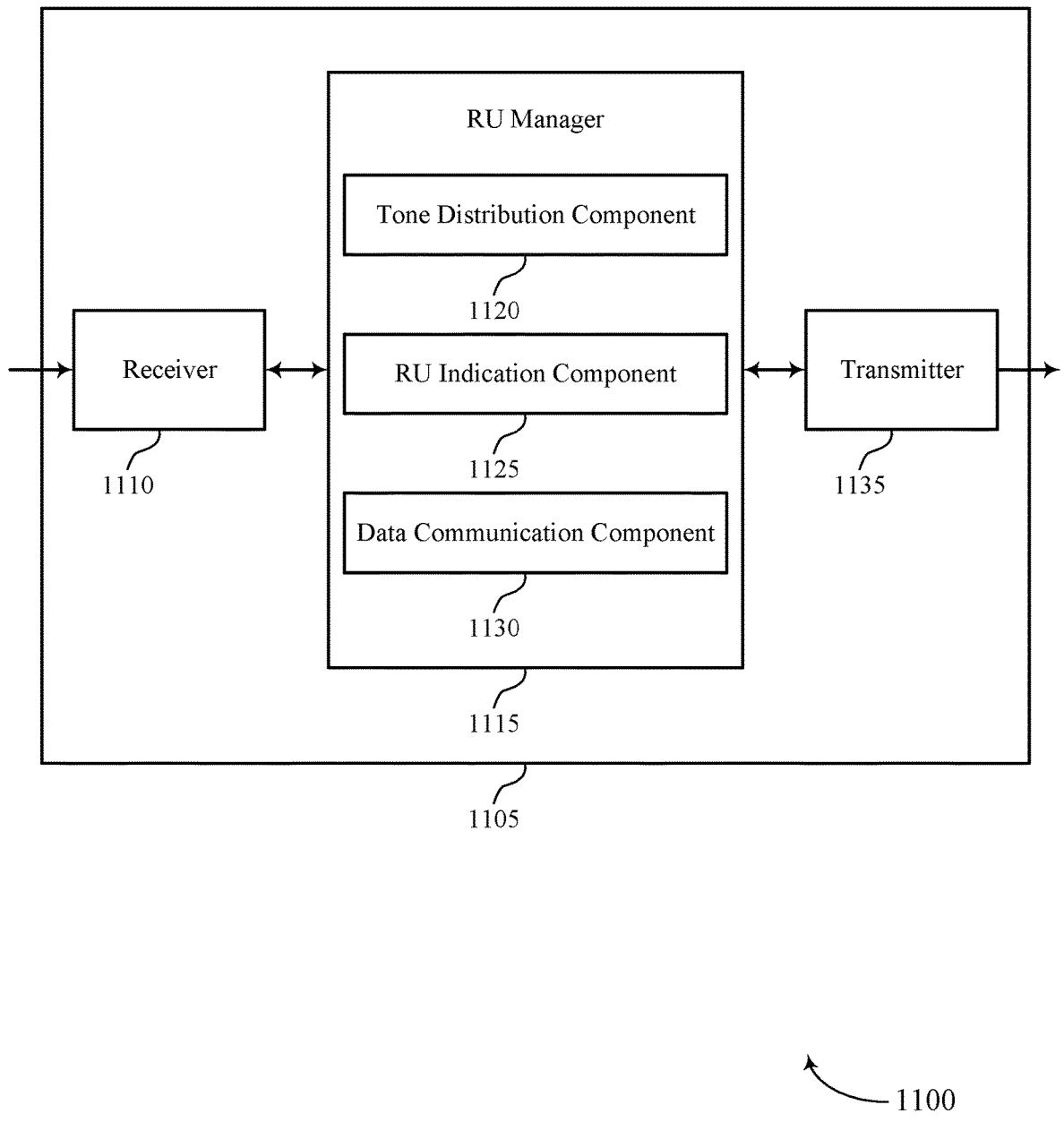

FIG. 11 shows a block diagram 1100 of an example wireless communication device 1105. The device 1105 may be an example of aspects of a device 1005 or an AP as described herein. The device 1105 may include a receiver 1110, an RU manager 1115, and a transmitter 1135. The device 1105 may also include a processor. Each of these components may be in communication with one another, for example, via one or more buses.

The receiver 1110 may receive information such as packets, user data, or control information associated with various information channels. Information may be passed on to other components of the device. The receiver 1110 may be an example of aspects of the transceiver 1320 described with reference to FIG. 13. The receiver 1110 may utilize a single antenna or a set of antennas.

The RU manager 1115 may be an example of aspects of the RU manager 1015 as described herein. The RU manager 1115 may include a tone distribution component 1120, an RU indication component 1125, and a data communication component 1130. The RU manager 1115 may be an example of aspects of the RU manager 1310 described herein.

The tone distribution component 1120 may assign a first RU to a first wireless node, in which the first RU includes a first non-contiguous set of tones of a channel. The RU indication component 1125 may generate a first indicator indicating the first RU and output the first indicator for transmission. The data communication component 1130 may obtain data from the first wireless node via the first RU.

The transmitter 1135 may transmit signals generated by other components of the device. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
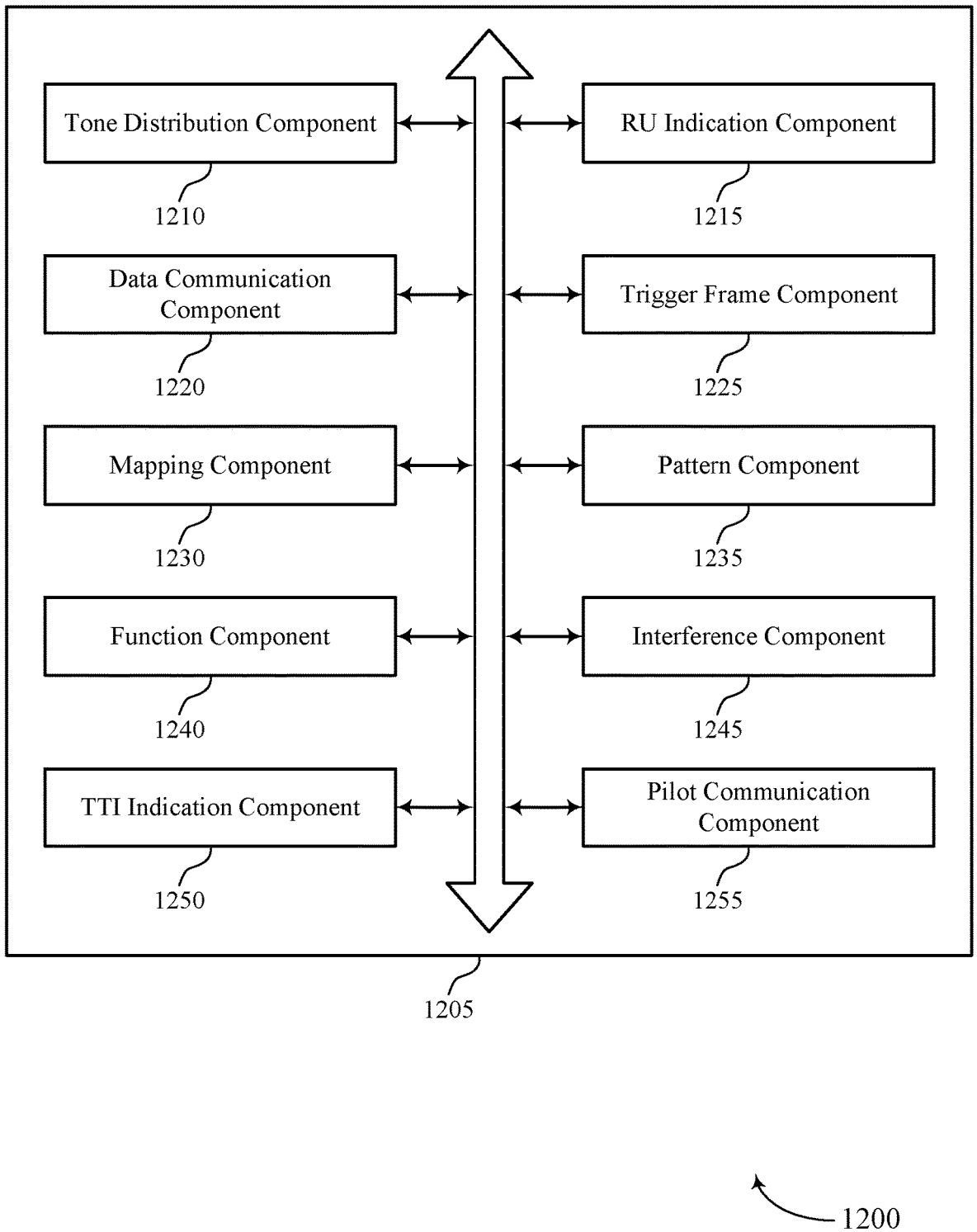
FIG. 12 shows a block diagram of an example RU manager.

FIG. 12 shows a block diagram 1200 of an example RU manager 1205. The RU manager 1205 may support RU spreading in accordance with aspects of the present disclosure. The RU manager 1205 may be an example of aspects of an RU manager 1015, an RU manager 1115, or an RU manager 1310 described herein. The RU manager 1205 may include a tone distribution component 1210, an RU indication component 1215, a data communication component 1220, a trigger frame component 1225, a mapping component 1230, a pattern component 1235, a function component 1240, an interference component 1245, a TTI indication component 1250, a pilot communication component 1255, or any combination of these components. Each of these modules may communicate, directly or indirectly, with one another, for example, via one or more buses.

The tone distribution component 1210 may assign a first RU to a first wireless node, in which the first RU includes a first non-contiguous set of tones of a channel. The RU indication component 1215 may generate a first indicator indicating the first RU and may output the first indicator for transmission. The data communication component 1220 may obtain data from the first wireless node via the first RU.

In some implementations, the tone distribution component 1210 may assign a second RU to a second wireless node, in which the second RU includes a second non-contiguous set of tones of the channel. In some of these implementations, the RU indication component 1215 may generate a second indicator indicating the second RU and may output the second indicator for transmission. The data communication component 1220 may obtain data from the second wireless node via the second RU. In some examples, the data from the first wireless node and the data from the second wireless node may be obtained concurrently. In some implementations, the first non-contiguous set of tones is interspersed with the second non-contiguous set of tones. The trigger frame component 1225 may generate a trigger frame including the first indicator and the second indicator and may output the trigger frame for transmission. Outputting the trigger frame may involve outputting the first indicator and outputting the second indicator.

The mapping component 1230 may generate an indication of a mapping from the first indicator to the first non-contiguous set of tones and may output the indication of the mapping for transmission.

The pattern component 1235 may change the first non-contiguous set of tones on a periodic basis according to a pattern, generate an indication of the pattern, and output the indication of the pattern for transmission.

In some examples, the first non-contiguous set of tones may be defined at least in part by a function. In some of these examples, the function component 1240 may generate one or both of an indication of the function or one or more parameter values for the function and may output, for transmission, one or both of the indication of the function or the one or more parameter values.

The interference component 1245 may determine, for the channel, one or more tones experiencing interference and may exclude the one or more determined tones from the first non-contiguous set of tones. In some examples, the interference component 1245 may obtain a message from the first wireless node or another wireless node indicating the one or more tones experiencing the interference. Determining the one or more tones may involve determining the one or more tones according to the message.

The TTI indication component 1250 may allocate a TTI for the first wireless node to transmit the data, generate an indication of the TTI, in which the TTI includes a set of time slots and the first non-contiguous set of tones is different in at least one time slot of the set of time slots than at least one other time slot of the set of time slots, and output the indication of the TTI for transmission.

In some implementations, the tone distribution component 1210 may determine the first non-contiguous set of tones distributed across a channel bandwidth of the channel, in which a majority of the first non-contiguous set of tones includes distributed pairs of adjacent tones and the channel bandwidth includes one or more leading unused edge tones, a first contiguous portion of useful tones, one or more unused DC tones, a second contiguous portion of useful tones, and one or more following unused edge tones, the first contiguous portion of useful tones and the second contiguous portion of useful tones including the determined first non-contiguous set of tones. In some of these implementations, the data communication component 1220 may obtain data over a set of data tones of the determined first non-contiguous set of tones, and a pilot communication component 1255 may obtain one or more pilot signals over a set of pilot tones of the determined first non-contiguous set of tones.

In some examples, the pilot communication component 1255 may allocate the channel bandwidth for a set of logic RUs including at least the first RU, in which pilot tones for the set of logic RUs form one or more contiguous sets of pilot tones, and each set of the one or more contiguous sets of pilot tones borders the one or more leading unused edge tones, the one or more unused DC tones, or the one or more following unused edge tones. In some other examples, the pilot communication component 1255 may allocate the channel bandwidth for a set of logic RUs including at least the first RU, in which pilot tones for the set of logic RUs form one or more contiguous sets of pilot tones, and each set of the one or more contiguous sets of pilot tones is allocated to central tones in the first contiguous portion of useful tones or to central tones in the second contiguous portion of useful tones. In yet some other examples, each pilot tone of the set of pilot tones may be contiguous to two data tones of the set of data tones.

Figure 13:
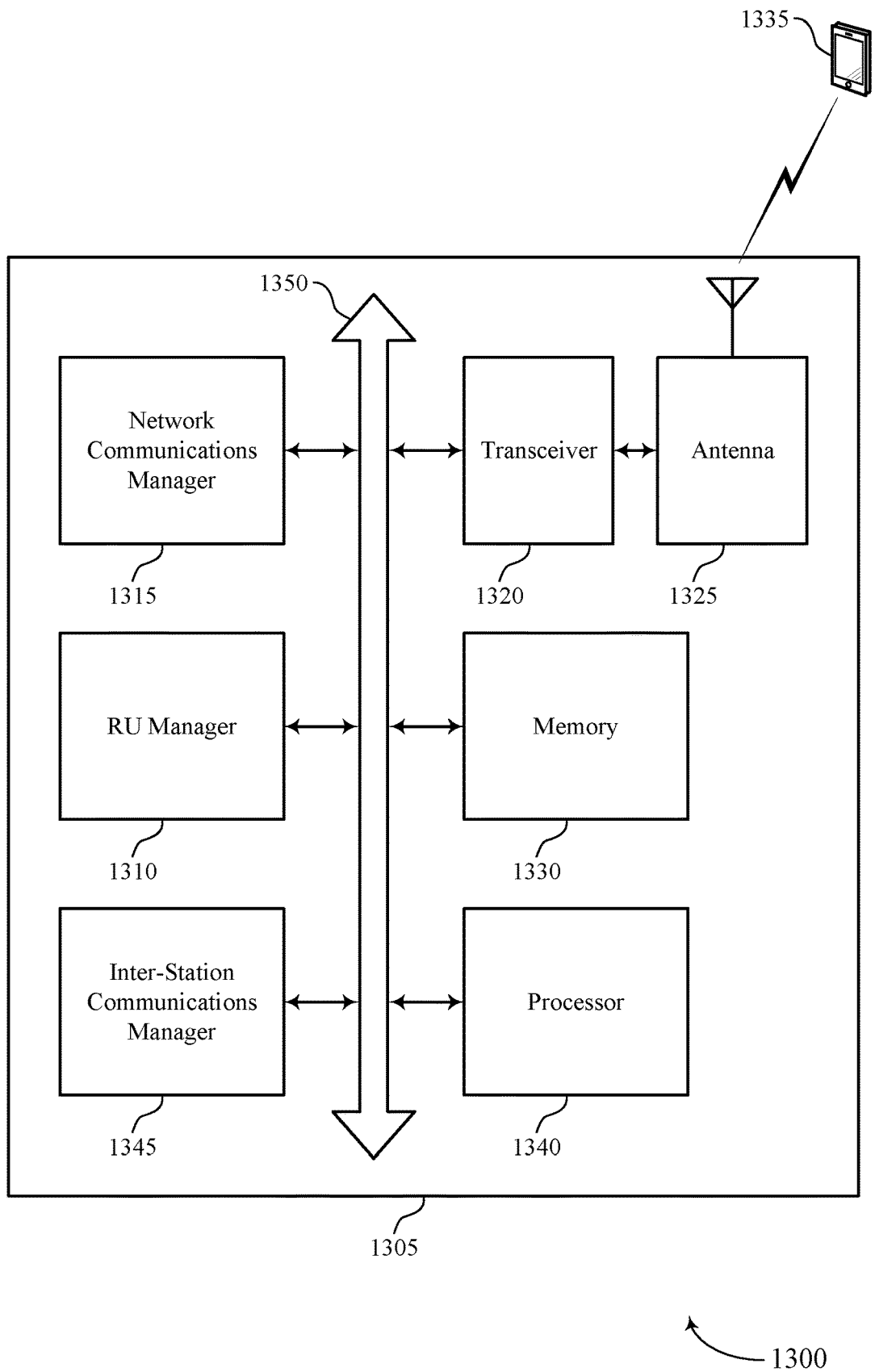
FIG. 13 shows a block diagram of an example access point (AP).

FIG. 13 shows a block diagram of an example AP. For example, a system 1300 may include a wireless communication device 1305, such as an AP, that supports RU spreading in accordance with aspects of the present disclosure. The device 1305 may be an example of or include the components of a device 1005, a device 1105, or an AP as described herein. The device 1305 may include components for bi-directional voice and data communications including components for transmitting and receiving communications, including an RU manager 1310, a network communications manager 1315, a transceiver 1320, an antenna 1325, memory 1330, a processor 1340, and an inter-station communications manager 1345. These components may be in electronic communication via one or more buses, such as bus 1350.

The RU manager 1310 may assign a first RU to a first wireless node, in which the first RU includes a first non-contiguous set of tones of a channel, generate a first indicator indicating the first RU, output the first indicator for transmission, and obtain data from the first wireless node via the first RU.

The network communications manager 1315 may manage communications with the core network via one or more wired or wireless backhaul links. For example, the network communications manager 1315 may manage the transfer of data communications for client devices, such as one or more STAs.

The transceiver 1320 may communicate bi-directionally, via one or more antennas, wired, or wireless links as described above. For example, the transceiver 1320 may represent a wireless transceiver and may communicate bi-directionally with another wireless transceiver, such as a wireless transceiver at a STA 1335. The transceiver 1320 may also include a modem to modulate the packets and provide the modulated packets to the antennas for transmission, and to demodulate packets received from the antennas. In some implementations, the wireless device may include a single antenna 1325. However, in some implementations the device may have more than one antenna 1325, which may be capable of concurrently transmitting or receiving multiple wireless transmissions.

The memory 1330 may include random-access memory (RAM) and read-only memory (ROM). The memory 1330 may store computer-readable, computer-executable code including instructions that, when executed, cause the processor to perform various functions described herein. In some implementations, the memory 1330 may contain, among other things, a basic input/output system (BIOS) which may control basic hardware or software operation such as the interaction with peripheral components or devices.

The processor 1340 may include an intelligent hardware device, such as a general-purpose processor, a DSP, a central processing unit (CPU), a microcontroller, an ASIC, an FPGA, a programmable logic device, a discrete gate or transistor logic component, a discrete hardware component, or any combination thereof. In some examples, the processor 1340 may be configured to operate a memory array using a memory controller. In other examples, a memory controller may be integrated into processor 1340. The processor 1340 may be configured to execute computer-readable instructions stored in a memory to perform various functions (for example, functions or tasks supporting RU spreading).

The inter-station communications manager 1345 may manage communications with other APs and may include a controller or scheduler for controlling communications with STAs in cooperation with other APs. For example, the inter-station communications manager 1345 may coordinate scheduling for transmissions to STAs for various interference mitigation techniques such as beamforming or joint transmission. In some examples, the inter-station communications manager 1345 may provide an X2 interface within a wireless communication network to provide communication between APs.

Figure 14:
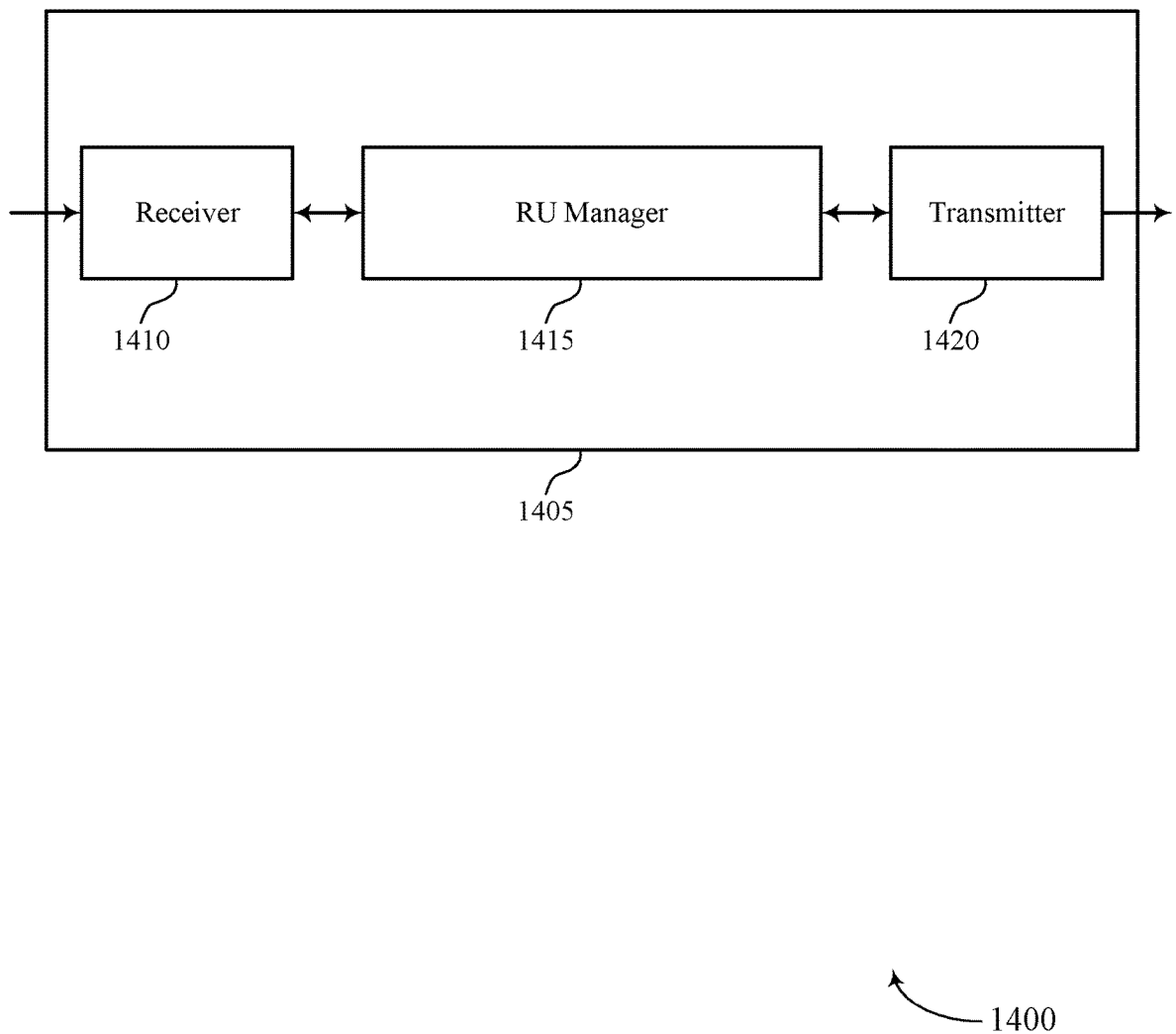
FIGS. 14 and 15 show block diagrams of example wireless communication devices.

FIG. 14 shows a block diagram 1400 of an example wireless communication device 1405. The device 1405 may be an example of aspects of a STA as described herein. The device 1405 may include a receiver 1410, an RU manager 1415, and a transmitter 1420. The RU manager 1415 can be implemented, at least in part, by one or both of a modem and a processor. Each of these components may be in communication with one another, for example, via one or more buses.

Receiver 1410 may receive information such as packets, user data, or control information associated with various information channels, such as control channels, data channels, and information related to RU spreading. Information may be passed on to other components of the device. The receiver 1410 may be an example of aspects of the transceiver 1720 described with reference to FIG. 17. The receiver 1410 may utilize a single antenna or a set of antennas.

The RU manager 1415 may obtain a first indicator indicating a first RU, determine a first non-contiguous set of tones of a channel for the first RU, and output data for transmission over the first non-contiguous set of tones for the first RU. The RU manager 1415 may be an example of aspects of the RU manager 1710 described herein.

The RU manager 1415, or its sub-components, may be implemented in hardware, code (software or firmware)

executed by a processor, or any combination thereof. The RU manager 1415, or its sub-components, may be physically located at different locations, including being distributed such that portions of functions are implemented at different physical locations by one or more physical components.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
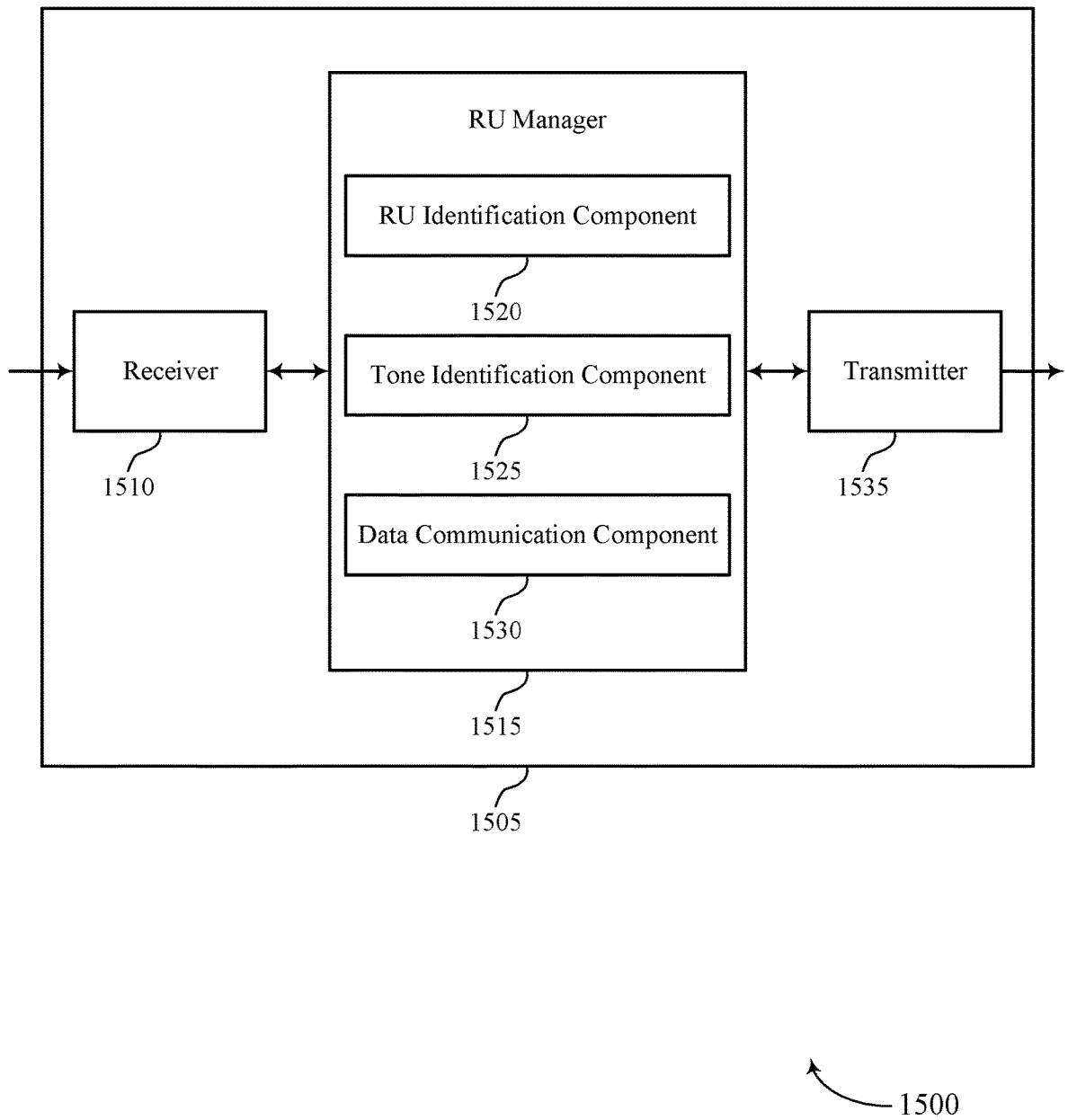

FIG. 15 shows a block diagram 1500 of an example wireless communication device 1505. The device 1505 may be an example of aspects of a device 1405 or a STA as described herein. The device 1505 may include a receiver 1510, an RU manager 1515, and a transmitter 1535. The device 1505 may also include a processor. Each of these components may be in communication with one another, for example, via one or more buses.

Receiver 1510 may receive information such as packets, user data, or control information associated with various information channels. Information may be passed on to other components of the device. The receiver 1510 may be an example of aspects of the transceiver 1720 described with reference to FIG. 17. The receiver 1510 may utilize a single antenna or a set of antennas.

The RU manager 1515 may be an example of aspects of the RU manager 1415 as described herein. The RU manager 1515 may include an RU identification component 1520, a tone identification component 1525, and a data communication component 1530. The RU manager 1515 may be an example of aspects of the RU manager 1710 described herein.

The RU identification component 1520 may obtain a first indicator indicating a first RU. The tone identification component 1525 may determine a first non-contiguous set of tones of a channel for the first RU. The data communication component 1530 may output data for transmission over the first non-contiguous set of tones for the first RU.

Transmitter 1535 may transmit signals generated by other components of the device. In some examples, the transmitter 1535 may be collocated with a receiver 1510 in a transceiver module. For example, the transmitter 1535 may be an example of aspects of the transceiver 1720 described with reference to FIG. 17. The transmitter 1535 may utilize a single antenna or a set of antennas.

Figure 16:
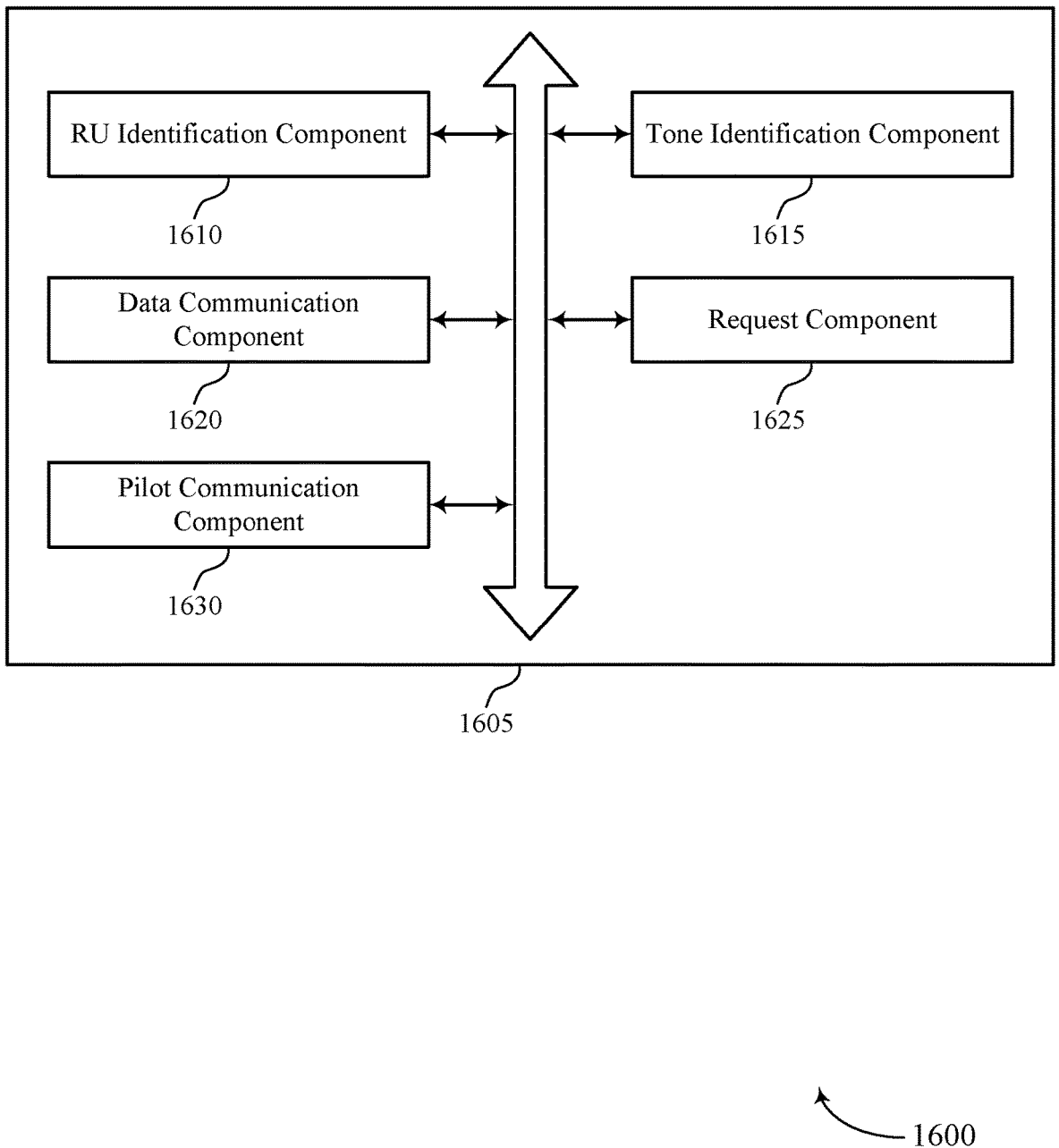
FIG. 16 shows a block diagram of an example RU manager.

FIG. 16 shows a block diagram 1600 of an example RU manager 1605. The RU manager 1605 may support RU spreading in accordance with aspects of the present disclosure. The RU manager 1605 may be an example of aspects of an RU manager 1415, an RU manager 1515, or an RU manager 1710 described herein. The RU manager 1605 may include an RU identification component 1610, a tone identification component 1615, a data communication component 1620, a request component 1625, a pilot communication component 1630, or any combination of these components. Each of these modules may communicate, directly or indirectly, with one another, for example, via one or more buses.

The RU identification component 1610 may obtain a first indicator indicating a first RU. The tone identification component 1615 may determine a first non-contiguous set of tones of a channel for the first RU. The data communication component 1620 may output data for transmission over the first non-contiguous set of tones for the first RU.

In some implementations, the RU identification component 1610 may determine that the first RU is additionally assigned to a second wireless node different than the wireless node. Outputting the data may further involve the data communication component 1620 outputting the data for transmission over a first subset of the first non-contiguous set of tones for the first RU.

In some implementations, the tone identification component 1615 may obtain one or more of a trigger frame including the first indicator, an indication of a mapping from the first indicator to the first non-contiguous set of tones, an indication of a pattern for changing the first non-contiguous set of tones on a periodic basis, an indication of a function defining the first non-contiguous set of tones, or one or more parameters for the function, in which the first non-contiguous set of tones for the first RU is determined according to one or more of the trigger frame, the mapping, the pattern, the function, or the one or more parameters for the function.

The request component 1625 may output, for transmission, one or both of a request requesting an RU or a message indicating that the wireless node is experiencing interference. The first indicator indicating the first RU may be obtained in response to one or both of the request or the message.

In some implementations, a majority of the first non-contiguous set of tones includes distributed pairs of adjacent tones across a channel bandwidth and the channel bandwidth includes one or more leading unused edge tones, a first contiguous portion of useful tones, one or more unused DC tones, a second contiguous portion of useful tones, and one or more following unused edge tones, the first contiguous portion of useful tones and the second contiguous portion of useful tones including the determined first non-contiguous set of tones. In some of these implementations, the pilot communication component 1630 may output, for transmission, one or more pilot signals over a set of pilot tones of the first non-contiguous set of tones. The data may be output for transmission over a set of data tones of the first non-contiguous set of tones.

Figure 17:
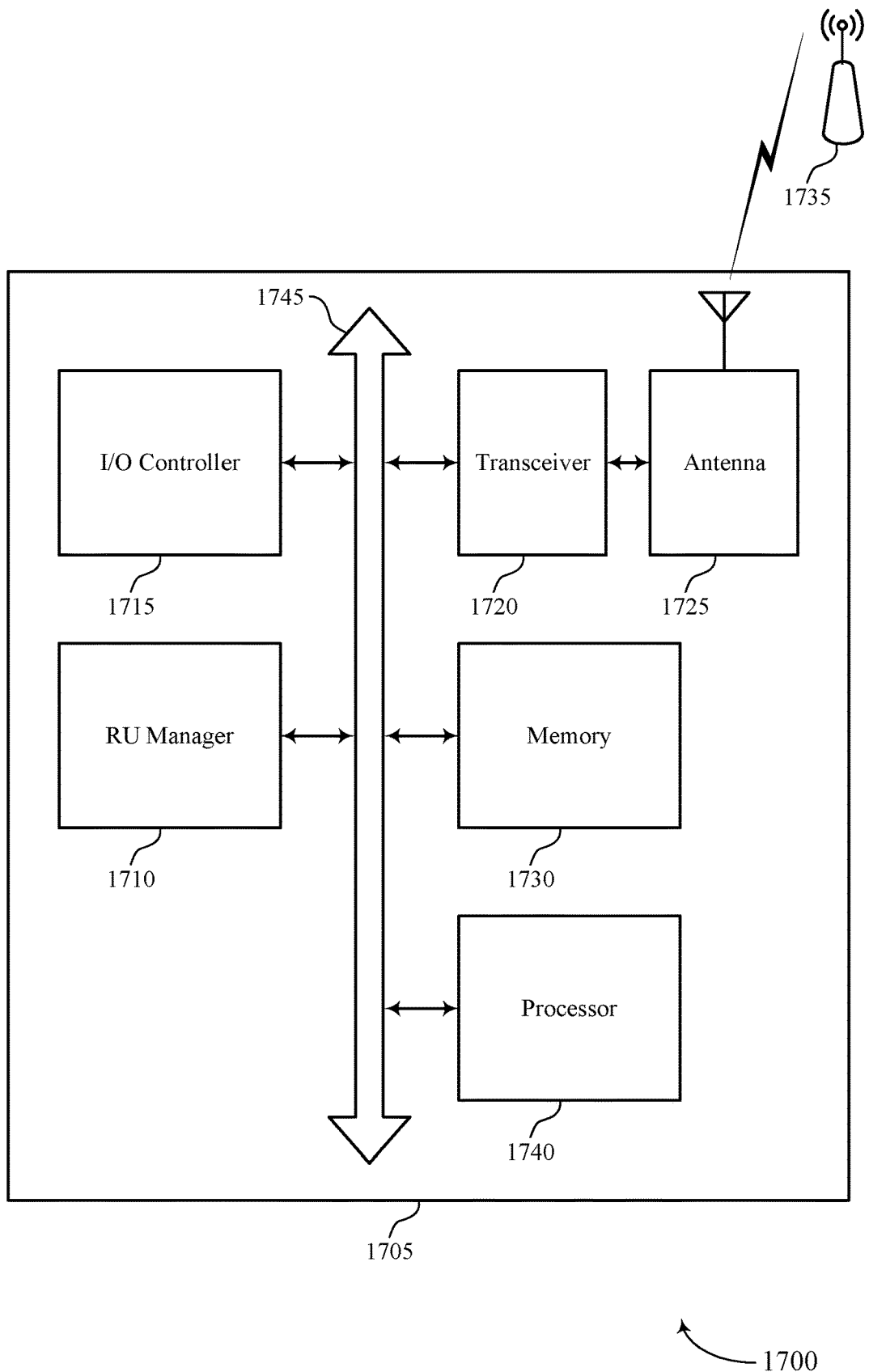
FIG. 17 shows a block diagram of an example STA.

FIG. 17 shows a block diagram of an example STA. For example, a system 1700 may include a wireless communication device 1705, such as a STA, that supports RU spreading in accordance with aspects of the present disclosure. The device 1705 may be an example of or include the components of device 1405, device 1505, or a STA as described herein. The device 1705 may include components for bi-directional voice and data communications including components for transmitting and receiving communications, including an RU manager 1710, an input/output (I/O) controller 1715, a transceiver 1720, an antenna 1725, memory 1730, and a processor 1740. These components may be in electronic communication via one or more buses, such as bus 1745.

The RU manager 1710 may obtain a first indicator indicating a first RU, determine a first non-contiguous set of tones of a channel for the first RU, and output data for transmission over the first non-contiguous set of tones for the first RU.

I/O controller 1715 may manage input and output signals for device 1705. I/O controller 1715 may also manage peripherals not integrated into device 1705. In some implementations, I/O controller 1715 may represent a physical connection or port to an external peripheral. In some examples, I/O controller 1715 may utilize an operating system such as iOS®, ANDROID®, MS-DOS®, MS-WINDOWS®, OS/2®, UNIX®, LINUX®, or another known operating system. In other examples, I/O controller 1715 may represent or interact with a modem, a keyboard, a mouse, a touchscreen, or a similar device. In some examples, I/O controller 1715 may be implemented as part of a processor. In some implementations, a user may interact with device 1705 via I/O controller 1715 or via hardware components controlled by I/O controller 1715.

Transceiver 1720 may communicate bi-directionally, via one or more antennas, wired, or wireless links as described above. For example, the transceiver 1720 may represent a wireless transceiver and may communicate bi-directionally with another wireless transceiver, such as a wireless transceiver that is part of an AP 1735. The transceiver 1720 may also include a modem to modulate the packets and provide the modulated packets to the antennas for transmission, and to demodulate packets received from the antennas.

In some examples, the wireless device may include a single antenna 1725. However, in other examples, the device may have more than one antenna 1725, which may be capable of concurrently transmitting or receiving multiple wireless transmissions.

Memory 1730 may include RAM and ROM. The memory 1730 may store computer-readable, computer-executable software including instructions that, when executed, cause the processor to perform various functions described herein. In some examples, the memory 1730 may contain, among other things, a BIOS which may control basic hardware or software operation such as the interaction with peripheral components or devices.

Processor 1740 may include an intelligent hardware device, such as a general-purpose processor, a DSP, a CPU, a microcontroller, an ASIC, an FPGA, a programmable logic device, a discrete gate or transistor logic component, a discrete hardware component, or any combination thereof. In some examples, processor 1740 may be configured to operate a memory array using a memory controller. In other examples, a memory controller may be integrated into processor 1740. Processor 1740 may be configured to execute computer-readable instructions stored in a memory to perform various functions.

Figure 18:
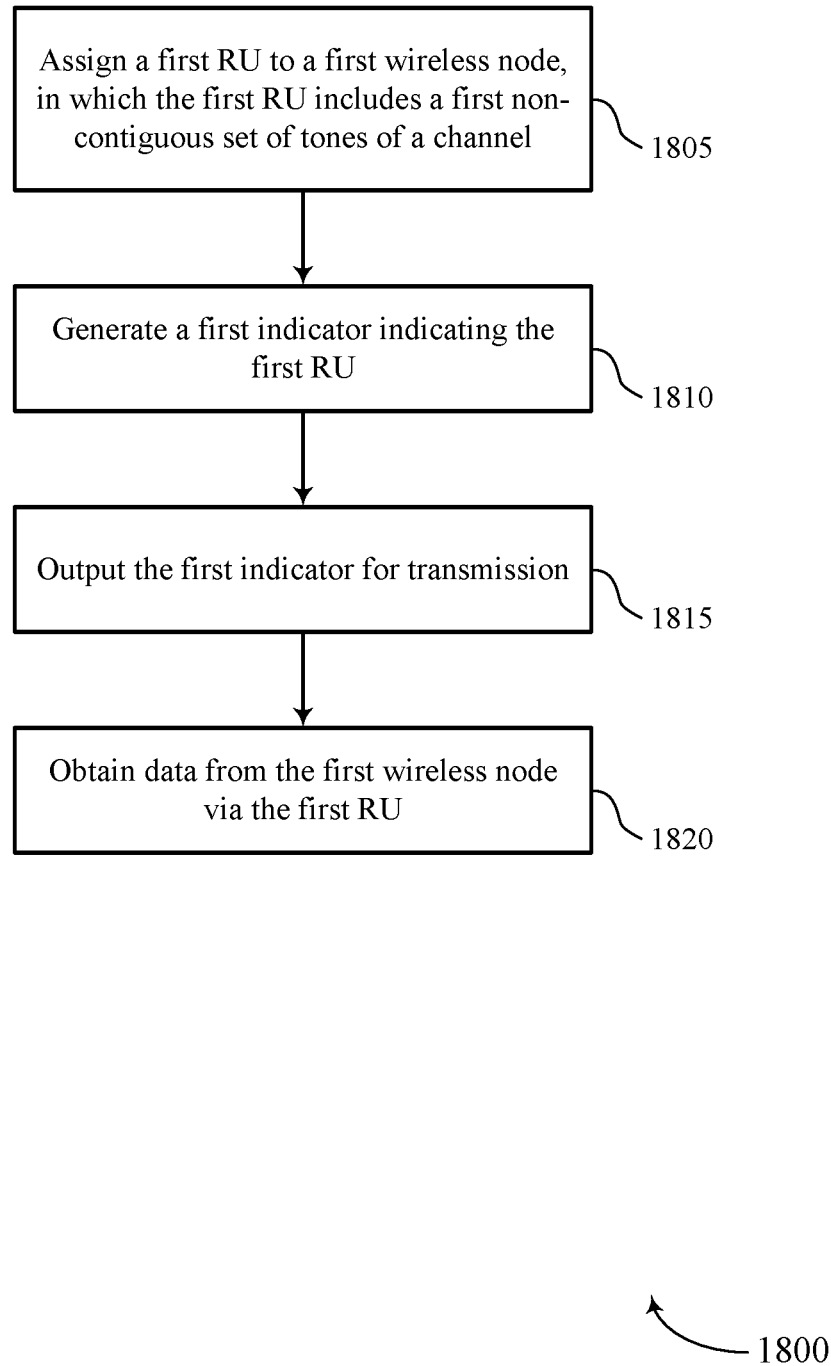
FIGS. 18-20 show flowcharts illustrating example processes for RU spreading according to some implementations.

FIG. 18 shows a flowchart illustrating an example process 1800 for RU spreading according to some implementations. The operations of process 1800 may be implemented by an AP or its components as described herein. For example, the operations of process 1800 may be performed by an RU manager as described with reference to FIGS. 10-13. In some examples, an AP may execute a set of instructions to control the functional elements of the AP to perform the functions described below. Additionally or alternatively, an AP may perform aspects of the functions described below using special-purpose hardware.

At 1805, the AP may assign a first RU to a first wireless node, in which the first RU includes a first non-contiguous set of tones of a channel. The operations of 1805 may be performed according to the methods described herein. In some examples, aspects of the operations of 1805 may be performed by a tone distribution component as described with reference to FIGS. 10-13.

At 1810, the AP may generate a first indicator indicating the first RU. The operations of 1810 may be performed according to the methods described herein. In some examples, aspects of the operations of 1810 may be performed by an RU indication component as described with reference to FIGS. 10-13.

At 1815, the AP may output the first indicator for transmission. The operations of 1815 may be performed according to the methods described herein. In some examples, aspects of the operations of 1815 may be performed by an RU indication component as described with reference to FIGS. 10-13.

At 1820, the AP may obtain data from the first wireless node via the first RU. The operations of 1820 may be performed according to the methods described herein. In some examples, aspects of the operations of 1820 may be performed by a data communication component as described with reference to FIGS. 10-13.

Figure 19:
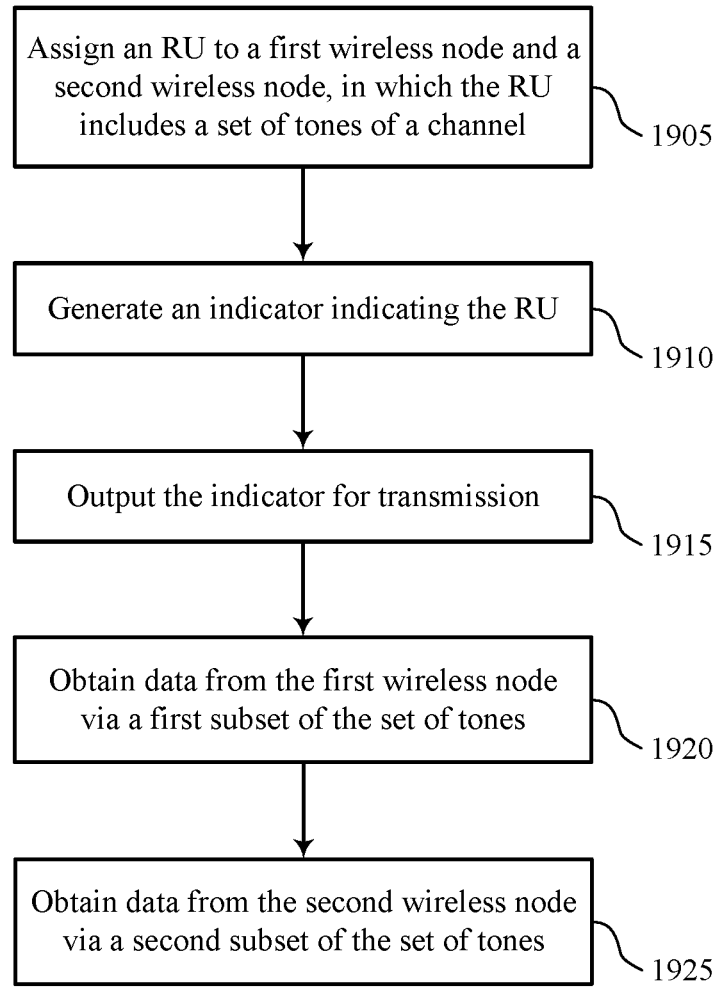

FIG. 19 shows a flowchart illustrating an example process 1900 for RU spreading according to some implementations. The operations of process 1900 may be implemented by an AP or its components as described herein. For example, the operations of process 1900 may be performed by an RU manager as described with reference to FIGS. 10-13. In some examples, an AP may execute a set of instructions to control the functional elements of the AP to perform the functions described below. Additionally or alternatively, an AP may perform aspects of the functions described below using special-purpose hardware.

At 1905, the AP may assign an RU to a first wireless node and a second wireless node, in which the RU includes a set of tones—such as a non-contiguous set of tones—of a channel. The operations of 1905 may be performed according to the methods described herein. In some examples, aspects of the operations of 1905 may be performed by a tone distribution component as described with reference to FIGS. 10-13.

At 1910, the AP may generate an indicator indicating the RU. The operations of 1910 may be performed according to the methods described herein. In some examples, aspects of the operations of 1910 may be performed by an RU indication component as described with reference to FIGS. 10-13.

At 1915, the AP may output the indicator for transmission. The operations of 1915 may be performed according to the methods described herein. In some examples, aspects of the operations of 1915 may be performed by an RU indication component as described with reference to FIGS. 10-13.

At 1920, the AP may obtain data from the first wireless node via a first subset of the set of tones for the RU. The first subset of tones may be non-contiguous. The operations of 1920 may be performed according to the methods described herein. In some examples, aspects of the operations of 1920 may be performed by a data communication component as described with reference to FIGS. 10-13.

At 1925, the AP may obtain data from the second wireless node via a second subset of the set of tones for the RU. The second subset of tones may be non-contiguous. The operations of 1920 may be performed according to the methods described herein. In some examples, aspects of the operations of 1920 may be performed by a data communication component as described with reference to FIGS. 10-13.

Figure 20:
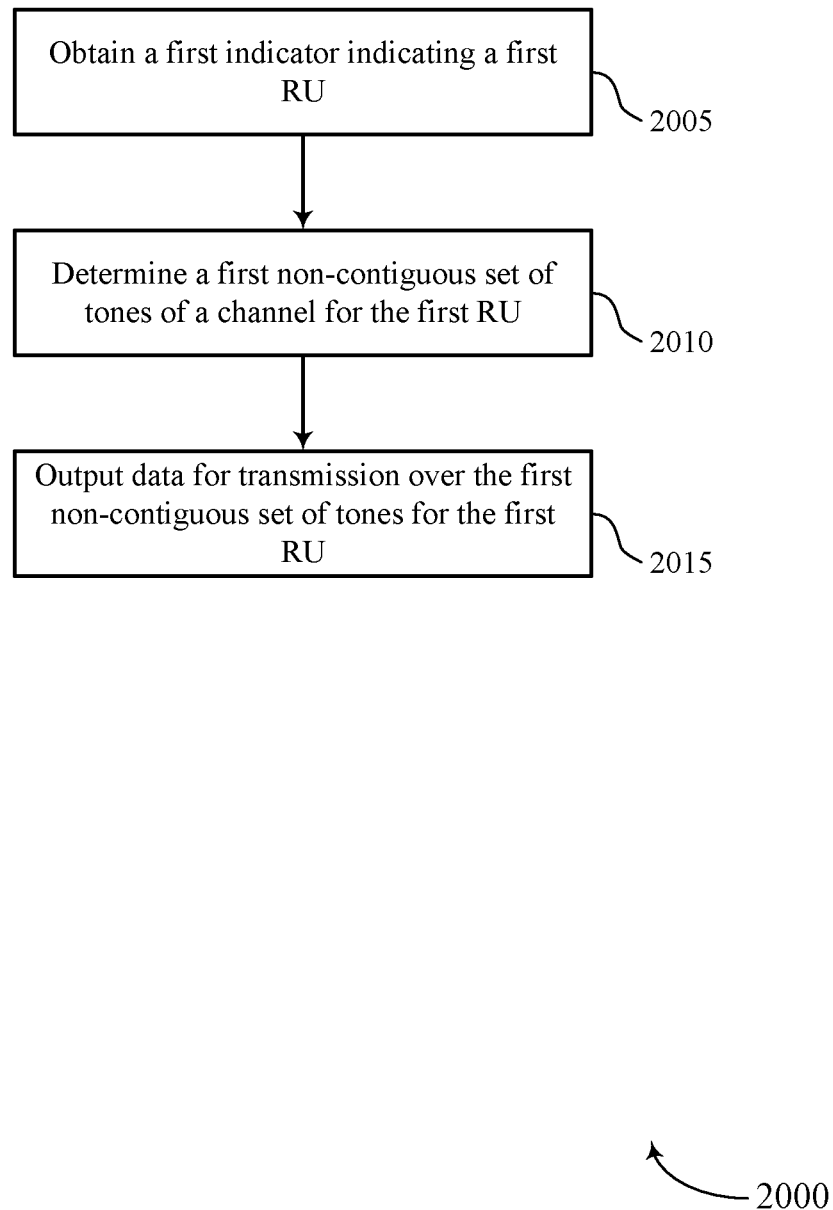

FIG. 20 shows a flowchart illustrating an example process 2000 for RU spreading according to some implementations. The operations of process 2000 may be implemented by a STA or its components as described herein. For example, the operations of process 2000 may be performed by an RU manager as described with reference to FIGS. 14-17. In some examples, a STA may execute a set of instructions to control the functional elements of the STA to perform the functions described below. Additionally or alternatively, a STA may perform aspects of the functions described below using special-purpose hardware.

At 2005, the STA may obtain a first indicator indicating a first RU. The operations of 2005 may be performed according to the methods described herein. In some examples, aspects of the operations of 2005 may be performed by an RU identification component as described with reference to FIGS. 14-17.

At 2010, the STA may determine a first non-contiguous set of tones of a channel for the first RU. The operations of 2010 may be performed according to the methods described herein. In some examples, aspects of the operations of 2010 may be performed by a tone identification component as described with reference to FIGS. 14-17.

At 2015, the STA may output data for transmission over the first non-contiguous set of tones for the first RU. The operations of 2015 may be performed according to the methods described herein. In some examples, aspects of the operations of 2015 may be performed by a data communication component as described with reference to FIGS. 14-17.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communications, comprising:
    assigning a first resource unit (RU) to a first wireless node and a second RU to a second wireless node, wherein the first RU comprises a first non-contiguous set of tones of a channel and the second RU comprises a second non-contiguous set of tones of the channel, the first non-contiguous set of tones comprising at least a first subset of tones and a second subset of tones non-contiguous with the first subset of tones, and the second non-contiguous set of tones comprising at least a third subset of tones and a fourth subset of tones non-contiguous with the third subset of tones;
    generating a first indicator indicating the first RU and a second indicator indicating the second RU;
    generating one or more trigger frames comprising at least the first indicator and the second indicator;
    outputting the one or more trigger frames for transmission; and
    obtaining concurrently data from the first wireless node via the first RU and data from the second wireless node via the second RU.

2. The method of claim 1, wherein the first non-contiguous set of tones is interspersed with the second non-contiguous set of tones in a frequency range of the channel.

3. The method of claim 1, further comprising:
    generating an indication of a mapping from the first indicator to the first non-contiguous set of tones; and
    outputting the indication of the mapping for transmission.

4. The method of claim 1, further comprising:
    changing the first non-contiguous set of tones on a periodic basis according to a pattern;
    generating an indication of the pattern; and
    outputting the indication of the pattern for transmission.

5. The method of claim 1, wherein the first non-contiguous set of tones is defined at least in part by a function, the method further comprising:
    generating one or both of an indication of the function or one or more parameter values for the function; and
    outputting, for transmission, one or both of the indication of the function or the one or more parameter values.

6. The method of claim 1, further comprising:
    determining, for the channel, one or more tones experiencing interference; and
    selecting tones for the first non-contiguous set of tones such that they do not include the one or more tones experiencing interference.

7. The method of claim 6, further comprising obtaining a message from the first wireless node or another wireless node indicating the one or more tones experiencing the interference, wherein determining the one or more tones comprises determining the one or more tones according to the message.

8. The method of claim 1, further comprising:
allocating a transmission time interval for the first wireless node to transmit the data from the first wireless node;
generating an indication of the transmission time interval, wherein the transmission time interval comprises a plurality of time slots and the first non-contiguous set of tones is different in at least one time slot of the plurality of time slots than at least one other time slot of the plurality of time slots; and
outputting the indication of the transmission time interval for transmission.

9. The method of claim 1, further comprising:
determining the first non-contiguous set of tones distributed across a channel bandwidth, wherein a majority of the first non-contiguous set of tones comprises distributed pairs of adjacent tones and the channel bandwidth comprises one or more leading unused edge tones, a first contiguous portion of useful tones, one or more unused direct current (DC) tones, a second contiguous portion of useful tones, and one or more following unused edge tones, the first contiguous portion of useful tones and the second contiguous portion of useful tones comprising the determined first non-contiguous set of tones;
obtaining the data from the first wireless node over a set of data tones of the determined first non-contiguous set of tones; and
obtaining one or more pilot signals over a set of pilot tones of the determined first non-contiguous set of tones.

10. The method of claim 9, further comprising allocating the channel bandwidth for a plurality of logic RUs comprising at least the first RU, wherein pilot tones for the plurality of logic RUs form one or more contiguous sets of pilot tones, and each set of the one or more contiguous sets of pilot tones borders the one or more leading unused edge tones, the one or more unused DC tones, or the one or more following unused edge tones.

11. The method of claim 9, further comprising allocating the channel bandwidth for a plurality of logic RUs comprising at least the first RU, wherein pilot tones for the plurality of logic RUs form one or more contiguous sets of pilot tones, and each set of the one or more contiguous sets of pilot tones is allocated to central tones in the first contiguous portion of useful tones or to central tones in the second contiguous portion of useful tones.

12. The method of claim 9, wherein each pilot tone of the set of pilot tones is contiguous to two data tones of the set of data tones.

13. The method of claim 1, wherein the one or more trigger frames comprise the first indicator, the second indicator, an indication of a mapping of the first indicator and the second indicator to respective non-contiguous sets of tones, an indication of a pattern for changing the respective non-contiguous sets of tones on a periodic basis, an indication of a function defining the respective non-contiguous sets of tones, one or more parameters for the function, or a combination thereof, wherein the respective non-contiguous sets of tones for the first RU and the second RU are determined according to the one or more trigger frames, the mapping, the pattern, the function, the one or parameters for the function, or a combination thereof.

14. A method for wireless communications at a wireless node, comprising:
obtaining one or more trigger frames comprising at least a first indicator indicating a first resource unit (RU) and an indication of a mapping from the first indicator to a first non-contiguous set of tones, the first non-contiguous set of tones comprising at least a first subset of tones and a second subset of tones non-contiguous with the first subset of tones;
determining the first non-contiguous set of tones of a channel for the first RU based at least in part on the obtained one or more trigger frames and the mapping; and
outputting data for transmission over the first non-contiguous set of tones for the first RU.

15. The method of claim 14, wherein the one or more trigger frames further comprise an indication of a pattern for changing the first non-contiguous set of tones on a periodic basis, an indication of a function defining the first non-contiguous set of tones, one or more parameters for the function, or a combination thereof, wherein the first non-contiguous set of tones for the first RU is determined according to the one or more trigger frames, the mapping, the pattern, the function, the one or more parameters for the function, or a combination thereof.

16. The method of claim 14, further comprising outputting, for transmission, one or both of a request requesting an RU or a message indicating that the wireless node is experiencing interference, wherein the first indicator indicating the first RU is obtained in response to one or both of the request or the message.

17. The method of claim 14, wherein a majority of the first non-contiguous set of tones comprises distributed pairs of adjacent tones across a channel bandwidth and the channel bandwidth comprises one or more leading unused edge tones, a first contiguous portion of useful tones, one or more unused direct current (DC) tones, a second contiguous portion of useful tones, and one or more following unused edge tones, the first contiguous portion of useful tones and the second contiguous portion of useful tones comprising the determined first non-contiguous set of tones, wherein the method further comprises:
outputting, for transmission, one or more pilot signals over a set of pilot tones of the first non-contiguous set of tones, wherein the data is output for transmission over a set of data tones of the first non-contiguous set of tones.

18. The method of claim 14, further comprising determining that the first RU is additionally assigned to a second wireless node different than the wireless node, wherein the outputting the data for transmission further comprises:
outputting the data for transmission over a first subset of the first non-contiguous set of tones for the first RU.

19. An apparatus for wireless communications, comprising:
a processor;
memory coupled with the processor; and
instructions stored in the memory and executable by the processor to cause the apparatus to:
assign a first resource unit (RU) to a first wireless node and a second RU to a second wireless node, wherein the first RU comprises a first non-contiguous set of tones of a channel and the second RU comprises a second non-contiguous set of tones of the channel, the first non-contiguous set of tones comprising at least a first subset of tones and a second subset of tones non-contiguous with the first subset of tones, and the second non-contiguous set of tones comprising at least a third subset of tones and a fourth subset of tones non-contiguous with the third subset of tones;

generate a first indicator indicating the first RU and a second indicator indicating the second RU;

generate one or more trigger frames comprising at least the first indicator and the second indicator;

output the one or more trigger frames for transmission; and obtain concurrently data from the first wireless node via the first RU and data from the second wireless node via the second RU.

20. The apparatus of claim 19, wherein the instructions are further executable by the processor to cause the apparatus to:

generate an indication of a mapping from the first indicator to the first non-contiguous set of tones; and output the indication of the mapping for transmission.

21. The apparatus of claim 19, wherein the instructions are further executable by the processor to cause the apparatus to:

change the first non-contiguous set of tones on a periodic basis according to a pattern;

generate an indication of the pattern; and output the indication of the pattern for transmission.

22. The apparatus of claim 19, wherein the first non-contiguous set of tones is defined at least in part by a function, the instructions further executable by the processor to cause the apparatus to:

generate one or both of an indication of the function or one or more parameter values for the function; and output, for transmission, one or both of the indication of the function or the one or more parameter values.

23. The apparatus of claim 19, wherein the instructions are further executable by the processor to cause the apparatus to:

determine, for the channel, one or more tones experiencing interference; and select tones for the first non-contiguous set of tones such that they do not include the one or more tones experiencing interference.

24. The apparatus of claim 19, wherein the instructions are further executable by the processor to cause the apparatus to:

allocate a transmission time interval for the first wireless node to transmit the data from the first wireless node;

generate an indication of the transmission time interval, wherein the transmission time interval comprises a plurality of time slots and the first non-contiguous set of tones is different in at least one time slot of the plurality of time slots than at least one other time slot of the plurality of time slots; and output the indication of the transmission time interval for transmission.

25. The apparatus of claim 19, wherein the instructions are further executable by the processor to cause the apparatus to:

determine the first non-contiguous set of tones distributed across a channel bandwidth, wherein a majority of the first non-contiguous set of tones comprises distributed pairs of adjacent tones and the channel bandwidth comprises one or more leading unused edge tones, a first contiguous portion of useful tones, one or more unused direct current (DC) tones, a second contiguous portion of useful tones, and one or more following unused edge tones, the first contiguous portion of useful tones and the second contiguous portion of useful tones comprising the determined first non-contiguous set of tones;

obtain the data from the first wireless node over a set of data tones of the determined first non-contiguous set of tones; and obtain one or more pilot signals over a set of pilot tones of the determined first non-contiguous set of tones.

26. The apparatus of claim 19, wherein the one or more trigger frames comprise the first indicator, the second indicator, an indication of a mapping of the first indicator and the second indicator to respective non-contiguous sets of tones, an indication of a pattern for changing the respective non-contiguous sets of tones on a periodic basis, an indication of a function defining the respective non-contiguous sets of tones, one or more parameters for the function, or a combination thereof, wherein the respective non-contiguous sets of tones for the first RU and the second RU are determined according to the one or more trigger frames, the mapping, the pattern, the function, the one or parameters for the function, or a combination thereof.

27. An apparatus for wireless communications at a wireless node, comprising:

a processor;

memory coupled with the processor; and instructions stored in the memory and executable by the processor to cause the apparatus to:

obtain one or more trigger frames comprising at least a first indicator indicating a first resource unit (RU) and an indication of a mapping from the first indicator to a first non-contiguous set of tones, the first non-contiguous set of tones comprising at least a first subset of tones and a second subset of tones non-contiguous with the first subset of tones;

determine the first non-contiguous set of tones of a channel for the first RU based at least in part on the obtained one or more trigger frames and the mapping; and output data for transmission over the first non-contiguous set of tones for the first RU.

28. The apparatus of claim 27, wherein the one or more trigger frames further comprise an indication of a pattern for changing the first non-contiguous set of tones on a periodic basis, an indication of a function defining the first non-contiguous set of tones, one or more parameters for the function, or a combination thereof, wherein the first non-contiguous set of tones for the first RU is determined according to the one or more trigger frames, the mapping, the pattern, the function, the one or more parameters for the function, or a combination thereof.

29. The apparatus of claim 27, wherein a majority of the first non-contiguous set of tones comprises distributed pairs of adjacent tones across a channel bandwidth and the channel bandwidth comprises one or more leading unused edge tones, a first contiguous portion of useful tones, one or more unused direct current (DC) tones, a second contiguous portion of useful tones, and one or more following unused edge tones, the first contiguous portion of useful tones and the second contiguous portion of useful tones comprising the determined first non-contiguous set of tones, wherein the instructions are further executable by the processor to cause the apparatus to:

output, for transmission, one or more pilot signals over a set of pilot tones of the first non-contiguous set of tones, wherein the data is output for transmission over a set of data tones of the first non-contiguous set of tones.

* * * * *